United States Patent [19]

Darian et al.

[11] Patent Number: 5,154,831

[45] Date of Patent: Oct. 13, 1992

[54] SOLVENT EXTRACTION PROCESS EMPLOYING COMMINUTING AND DISPERSING SURFACTANTS

[75] Inventors: Saeed T. Darian, Sugarland; Stephen P. Weinberg, Houston, both of Tex.

[73] Assignee: ENSR Corporation, Houston, Tex.

[21] Appl. No.: 591,116

[22] Filed: Oct. 2, 1990

Related U.S. Application Data

[63] Continuation-in-part of Ser. No. 289,219, Dec. 22, 1988, Pat. No. 5,055,196.

[51] Int. Cl.$^5$ .................... B01D 11/00; C02F 1/26
[52] U.S. Cl. .................... 210/639; 208/262.1; 208/262.5; 210/634; 210/738; 210/804; 210/805; 210/806; 210/908; 210/909
[58] Field of Search ............... 210/634, 638, 639, 691, 210/698, 708, 738, 739, 804, 805, 806, 908, 909, 925; 208/262.1, 262.5

[56] References Cited

U.S. PATENT DOCUMENTS

| | | | |
|---|---|---|---|
| 2,226,532 | 12/1940 | Hawley | 210/634 |
| 3,940,334 | 2/1976 | Miyazawa | 210/634 |
| 4,336,136 | 6/1982 | Giguere | 210/195.1 |
| 4,374,735 | 2/1983 | Linderfor et al. | 210/925 |
| 4,424,081 | 1/1984 | Giguere | 134/25.1 |
| 4,430,208 | 2/1984 | Pytlewski | 208/262 |
| 4,589,985 | 5/1986 | Yorke | 210/699 |
| 4,593,760 | 6/1986 | Visser et al. | 166/267 |
| 4,599,117 | 7/1986 | Luxemburg | 134/25.1 |
| 4,606,774 | 8/1986 | Morris | 134/12 |
| 4,610,729 | 9/1986 | Keane | 134/26 |
| 4,634,520 | 1/1987 | Angelov et al. | 210/708 |
| 4,659,443 | 4/1987 | Byker | 208/262.5 |
| 4,660,639 | 4/1987 | Visser et al. | 166/267 |
| 4,662,990 | 5/1987 | Bonanno | 210/195.1 |
| 4,726,905 | 2/1988 | Friedman et al. | 210/909 |
| 4,783,263 | 11/1988 | Trost et al. | 134/25.1 |
| 4,792,413 | 12/1988 | Nash et al. | 252/111 |
| 4,801,334 | 1/1989 | Steiner | 210/909 |
| 4,801,384 | 1/1989 | Steiner | 210/634 |
| 4,824,555 | 4/1989 | Paspek et al. | 210/708 |
| 4,830,759 | 5/1989 | Charlier | 210/925 |
| 4,841,998 | 6/1989 | Bruya | 134/25.1 |
| 4,844,745 | 7/1989 | Nash et al. | 210/909 |
| 4,869,825 | 9/1989 | Steiner | 210/634 |
| 4,952,315 | 8/1990 | Saab | 134/25.1 |

FOREIGN PATENT DOCUMENTS

| | | | |
|---|---|---|---|
| 1132731 | 9/1982 | Canada | 210/634 |
| 1145284 | 4/1983 | Canada | 208/391 |
| 298610 | 1/1989 | European Pat. Off. | 210/708 |
| 2901927 | 7/1979 | Fed. Rep. of Germany | 134/40 |
| 0162454 | 9/1984 | Japan | 210/634 |
| 8602434 | 4/1986 | PCT Int'l Appl. | 134/12 |
| 1457608 | 12/1976 | United Kingdom | 210/634 |
| 1458633 | 12/1976 | United Kingdom | 210/634 |
| 2049466 | 12/1980 | United Kingdom | 210/634 |
| 9006795 | 6/1990 | World Int. Prop. O. | 134/25.1 |

OTHER PUBLICATIONS

Ben H. carpenter; PCB Sediment Decontamination-Technical/Economic Assessment of Selected Alternative Treatments; Dec. 1986, pp. 54-120; Haz. Waste Engr. Research & Development, U.S. Environmental Protection Agency, Cincinnati, Ohio 45268.

John M. Moses; Ramin Abrishamian; Use of Liquified Gas Solvent Extraction in Hazardous Waste Site Closures; Aug. 1988.

AICHE 1988 1988 Summer National Meeting, Denver, Colo., Aug. 21-24.

Article by Sarber, et al. "Tar Sands Extractions with Microemulsions and Emulsions", The Canadian Journal of Chemical Engineering, vol. 62, Apr. 1984.

Primary Examiner—Robert A. Dawson
Assistant Examiner—Joseph Drodge
Attorney, Agent, or Firm—Felfe & Lynch

[57] ABSTRACT

The present invention is directed to a process for treating an oily substrate, including a mixture comprising water and oily material or a mixture comprising water, solids and oily material as components, and wherein such treatment comprises contacting the oily substrate with a solvent for the oily material, and wherein the solvent for the oily material ranges in solubility in water from sparingly soluble to substantially water insoluble, in the presence of an added comminuting and dispersing surfactant, to produce by such contacting at least one phase differentiating interface, and to thereby render one or more of the components of the oily substrate separable.

142 Claims, 8 Drawing Sheets

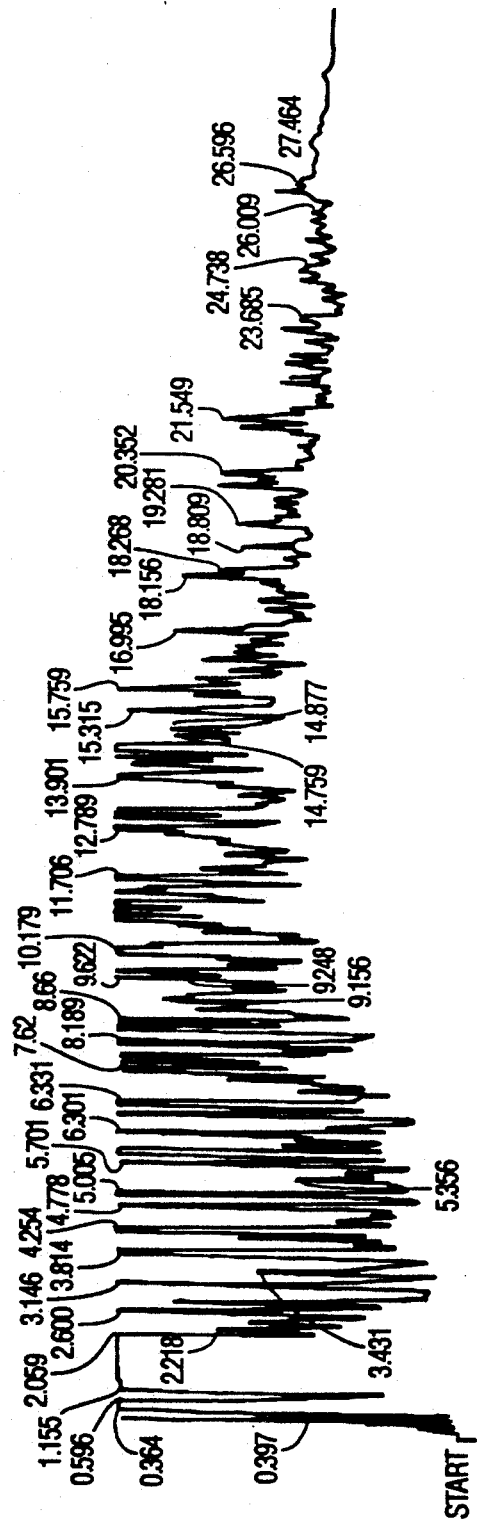

SOLVENT EXTRACTION PROCESS EMPLOYING COMMINUTING AND DISPERSING SURFACTANTS

CROSS-REFERENCE TO CO-PENDING APPLICATIONS

This application is a continuation-in-part of application Ser. No. 07/289,219 filed Dec. 22, 1988, now U.S. Pat. No. 5,055,196 for An Extraction Process to Remove PCBs from Soil and Sludge, the entire disclosure of which is incorporated herein by reference.

FIELD OF THE INVENTION

The present invention relates to a process for treating an oily substrate which can include for example, water, and an oily material such as organic hydrocarbons as components of the oily substrate and which can additionally contain solids, and dispersions and/or emulsions thereof, which process provides the ability to recover, recycle or dispose of any of the components present. More particularly, the present invention successfully treats oily substrates such as sludges containing oily materials, solids made up of particles having a tendency to agglomerate or agglutinate and water, and particularly such mixtures containing large amounts of water. This invention also successfully treats emulsions such as oil-in-water and water-in-oil emulsions which may or may not contain solid particulate matter. This invention particularly relates to treatment of oily materials such as sludges resulting from petroleum refining operations, sludges present in waste disposal pits, ponds or lagoons, sludges generated from deep oil and gas well injection streams and soils contaminated with oily materials, other emulsions comprising solids and water and oily materials and emulsions comprising only oily materials and water.

BACKGROUND OF THE INVENTION

Many industrial endeavors result in the creation of effluent or liquid waste which can be characterized as an oily substrate and which can require treatment for component recovery and potential reuse and/or disposal of waste components depending on environmental concerns. Many industrial processes economically depend upon recycle of component materials. Further, recent and proposed environmental laws and regulations increasingly place an environmental consciousness and stress upon producers of oily material waste, and regulations have changed causing disposal methods which had previously been acceptable to become unacceptable from an environmental viewpoint.

Oily substrates as wastes generally involve mixtures of water and oily materials such as hydrocarbons including potentially hazardous components such as polychlorinated biphenyls, benzene, toluene and the like and can additionally contain solids. A common source of such oily substrates is due to oil and gas industry activities in exploration, production, refining and petrochemical production. Oily substrates are created at the well head in deep well injection systems in the form of residue from drilling mud and production water. Oily substrates are also created in refineries in many different forms from water collected in storm sewers at a refinery to streams from the refining process. Oily substrates are also created in the cleaning of transport trucks and rail cars which move crude petroleum and oil products. Moreover, oily substrates are created in the same manner in chemical plants which involve the processing of petroleum products and which involve the manufacture of chemicals and chemical products for distribution and sale. Nearly all of these oily substrates have common characteristics. For example, they routinely contain, as components, solids, usually in a small amount, and oily materials which contaminate both the solids and water. Oily substrates also typically exist in the form of emulsions comprising solids, oily materials and water, or oil-in-water or water-in-oil emulsions. Water is normally present and at times can make up a large part of the oily substrates. The presence in these oily substrates, particularly of large amounts of water, often emulsified with the oily material present, compounds the difficulty and expense with respect to separating these materials into components for either recycle use or environmentally acceptable disposal.

Many attempts have been made to deal with this problem in order to be able to remove or separate the oily materials present, to recycle reusable components or, to dispose of environmentally detrimental materials and to limit the resultant liability of the generator or owner of the oily substrate as a waste and waste disposal site.

Several varieties of treatment techniques are known involving various solvents and approaches to remove or separate the components in oily substrate type effluent or hazardous waste. For example, one such attempt at separating materials for disposal is described in John H. Moses, "Use of Liquified Gas Solvent Extraction in Hazardous Waste Site", presented at the AICAG 1988 Summer National Meeting in Denver, Colo., August 1988, wherein sludges containing oil, water and solids are treated under high pressures with propane in a gaseous treatment process. The pressurized extraction of the oil or hydrocarbon is followed by a separation of water and solids with the propane solvent being recovered by flashing it off as a vapor in a flash tank. The solvent is then recovered, repressurized and returned to the process. This gaseous solvent process thus is distinguished from liquid solvent treatments which require separation by distillation. However, while simple in concept, the above-described process as well as other conventional processes are yet to be successfully applied to the clean-up of sludges, as, often the solids in sludges and oily substrates comprising solids in general tend to agglomerate when conventional treatment procedures are attempted thus trapping oily materials within the solids mass preventing contact with the solvent used for oily material removal.

Although attempts made in the art to clean such oily material wastes have been admirable, problems still remain in connection with the processing of such materials in an environmentally safe manner for reuse or disposal. Heretofore, waste effluent and sludges in particular with oily materials present and containing large quantities of water could not be economically treated and the components thereof separated and such oily substrates are usually disposed of via land disposal techniques. However, current environmental legislation and regulations ban use in the future of land disposal techniques.

Also, oily substrates in the form of emulsions of oil-in-water and water-in-oil, for example formed during oil production operations or in petrochemical processing, also present heretofore unsolved treatment problems for recycle and waste disposals.

If treatment can occur at locations where oily substrates are generated and some of the components thereof, such as solids and water, can be disposed of on site after processing, considerable savings can result compared to hauling the oily substrate as a waste to another location for disposal.

SUMMARY OF THE INVENTION

Accordingly, an object of this invention is to provide a treating process which will breakdown an oily substrate and allow phase separation to occur permitting solids therein to be removed from the oily materials present in an oily substrate.

A further object of this invention is to provide a treating process which will break down an oily substrate comprising an oily material and water and allow phase separation to occur to permit recycle of desirable components therein and/or their removal.

A further object of this invention is to provide a method whereby oily substrates often containing high water concentrations can be treated for separation of oily material and water, and which may additionally contain solids, in a manner which allows for environmentally safe disposal of or recycle of the components of the oily substrate.

An even further object of this invention to provide a process whereby oily substrates can be treated economically to quickly effect separation of the components present in the oily substrates and, in instances where a high oily material content is present, to recover such from the oily substrates in volumes and of sufficient quality to allow refinery processing to occur on the oily material component recovered in order to produce a product which can be utilized commercially.

A still further object of this invention to provide a treatment process whereby a treating solvent used in the treatment process can be easily recovered for reuse.

Further objects of the present invention will be readily apparent to persons skilled in the art from the following discussion.

The present invention provides a process for treating oily substrates comprising water and oily materials and which can further comprise solids, in widely varying amounts, and emulsions thereof.

In one embodiment of this invention, there is provided a process for treating an oily substrate selected from the group consisting of a mixture (a) comprising water and oily material or (b) comprising water, solids and oily materials as components of said substrate, wherein the process comprises:
 (1) contacting the oily substrate with a solvent for the oily material, said solvent being sparingly soluble in water, in the presence of a comminuting surfactant to produce at least one phase differentiating interface and to thereby render one or more components of the oily substrate separable.

In an additional embodiment of this invention, there is provided a process for treating an oily substrate selected from the group consisting of a mixture (a) comprising water and oily materials or (b) comprising water, solids, and oily materials, as components of the substrate, said process comprising:
 (1) contacting the oily substrate with a solvent for the oily material, said solvent being sparingly soluble in water, in the presence of a comminuting surfactant, to produce at least one phase differentiating interface and to thereby render one or more components of the oily substrate separable; and
 (2) separating at least one phase from other phases present.

In a further embodiment of this invention, there is provided a process for treating an oily substrate selected from the group consisting of a mixture (a) comprising water and oily materials, and or (b) comprising water, solids and oily materials, as components of the substrate, said process comprising:
 (1) contacting the oily substrate with a solvent for the oily material, said solvent being sparingly soluble in water, in the presence of a comminuting surfactant, to produce at least one phase differentiating interface and to thereby render one or more components of the oily substrate separable;
 (2) separating at least one phase from other phases. present to obtain a separated phase comprising the solvent; and
 (3) removing the solvent from said separated phase.

Also, an embodiment of this invention provides a process for treating an oily substrate selected from the group consisting of a mixture (a) comprising water and oily materials or (b) comprising water, solids and oily material as components of the substrate, said process comprising:
 (1) contacting the oily substrate with a solvent for the oily material, said solvent being sparingly soluble in water, in the presence of a comminuting surfactant, to produce at least one phase differentiating interface and to thereby render one or more components of the oily substrate separable;
 (2) separating at least one phase from other phases present to obtain a separated phase comprising the solvent;
 (3) recovering the solvent from said separated phase; and,
 (4) recycling the recovered solvent to the contacting of step (1) as at least part of the solvent of contacting step (1).

In a still further embodiment of this invention, provided is a process for treating an oily substrate selected from the group consisting of a mixture (a) comprising water and oily material or (b) comprising water, solids and oily materials as components of the substrate said process comprising:
 (1) contacting the oily substrate with a solvent for the oily material, said solvent being sparingly soluble in water, in the presence of a comminuting surfactant, to produce at least one phase differentiating interface and to thereby render one or more components of the oily substrate separable;
 (2) separating at least one phase from other phases present to obtain a separated phase comprising the oily material and at least some of the solvent;
 (3) removing the solvent from said separated phase; and
 (4) recycling said oily material from said separated phase to the contacting of step (1) for further treatment.

In yet a further embodiment of the present invention, a process is provided such as set forth in any of the above-described embodiments which comprises the step of contacting an oily substrate with a solvent for the oily material, said solvent being sparingly soluble in water, in the presence of a comminuting surfactant, and at a pH effective to produce at least one phase differentiating interface and to render one or more components of the oily substrate separable at a rate faster than in the absence of said pH.

In yet still a further embodiment of the present invention a process is provided such as set forth above which comprises the step of contacting an oily substrate containing solid particulate matter with a solvent for the oily material, said solvent being sparingly soluble in water, in the presence of a comminuting surfactant, to produce at least one phase differentiating interface and flocculating the solids present to render one or more components of the oily substrate separable at a rate faster than in the absence of said flocculation.

A still further embodiment of the present invention provides such a process as described in any of the aforesaid embodiments which comprises the step of contacting an oily substrate containing solids with a solvent for the oily material, said solvent being sparingly soluble in water, in the presence of a comminuting surfactant, and at a pH effective to produce at least one phase differentiating interface and flocculating the solids present to render one or more of the components of the oily substrate separable at rate faster than in the absence of said flocculation and at said pH.

The present invention is particularly successful in removing oily materials such as hydrocarbons from oily substrates comprising oily material and large quantities of water and which may additionally contain solids, and emulsified versions thereof, which are notoriously difficult to handle and separate components for recycle and/or disposal, and which could not heretofore be economically treated. The rapid comminution of the oily substrate and phase differentiation interface formation followed by separation and settling of one or more phases, for example, separation of a solids phase from liquid phases present are particular advantages of the invention. The invention is more fully described in the following detailed discussion.

BRIEF DESCRIPTION OF THE DRAWINGS

FIGS. 7A and 7B show two chromatographs obtained upon analyses of liquids solvent phase samples produced in Example 7.

DETAILED DESCRIPTION OF THE INVENTION

Figure 1:
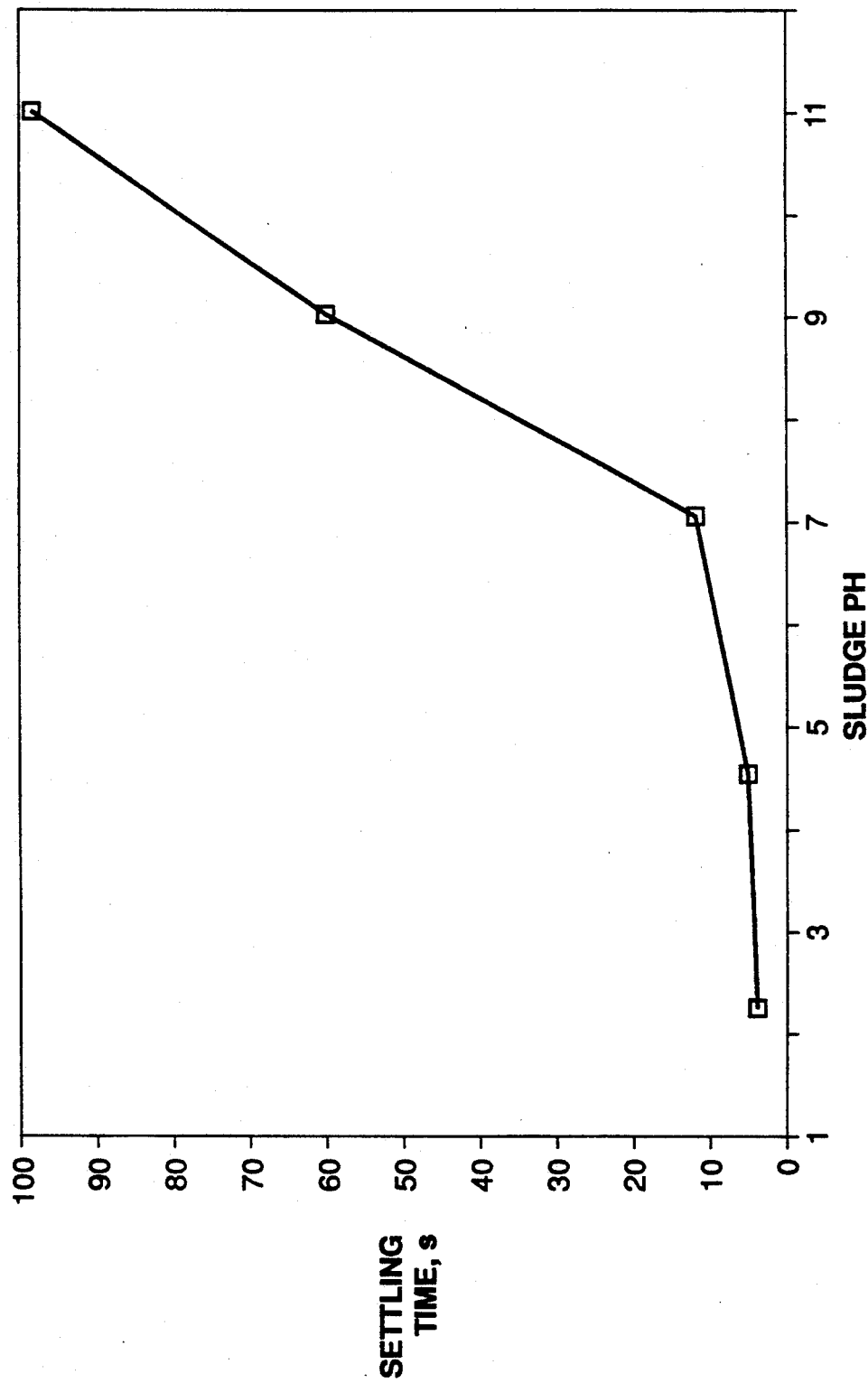
FIG. 1 is a plot showing the effect of pH on settling rates of solids present in an API sludge as an oily substrate using a hexane/surfactant system in accordance with the invention.
Figure 2A:
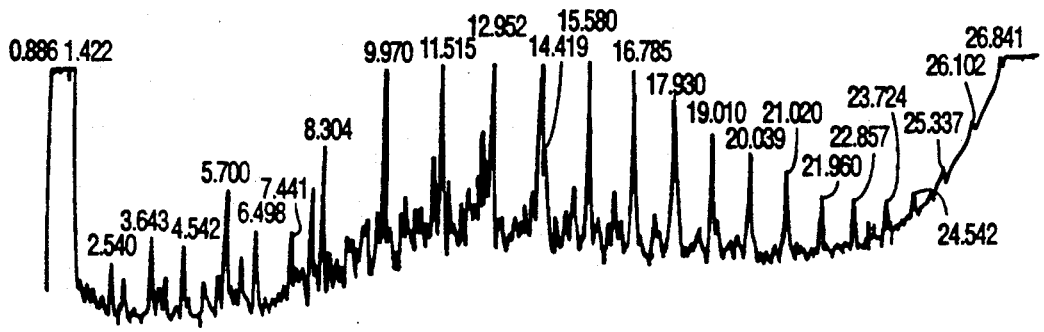
FIGS. 2A-2D show four chromatographs obtained upon analysis of the liquids solvent phase containing oily materials in the batch processing of Example 1.
Figure 2B:
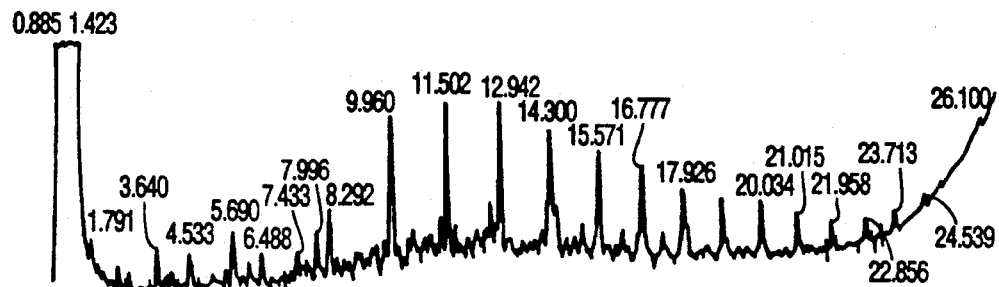
Figure 2C:
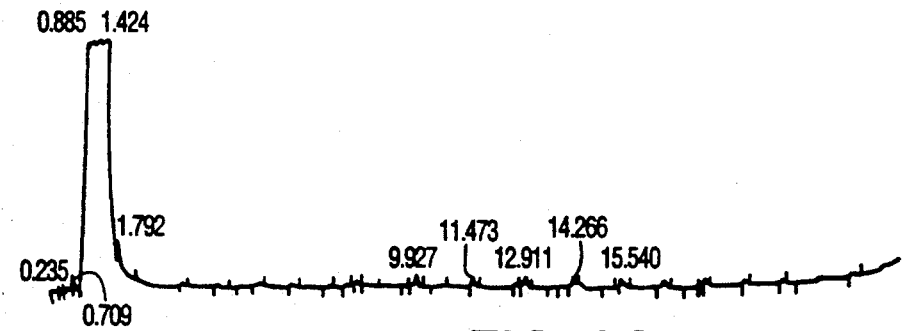
Figure 2D:
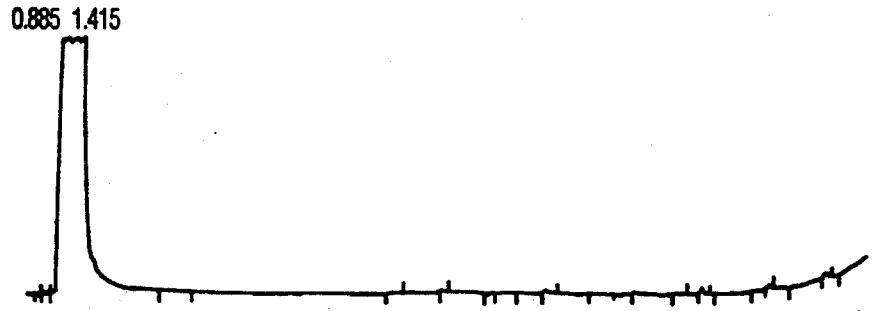
Figure 3A:
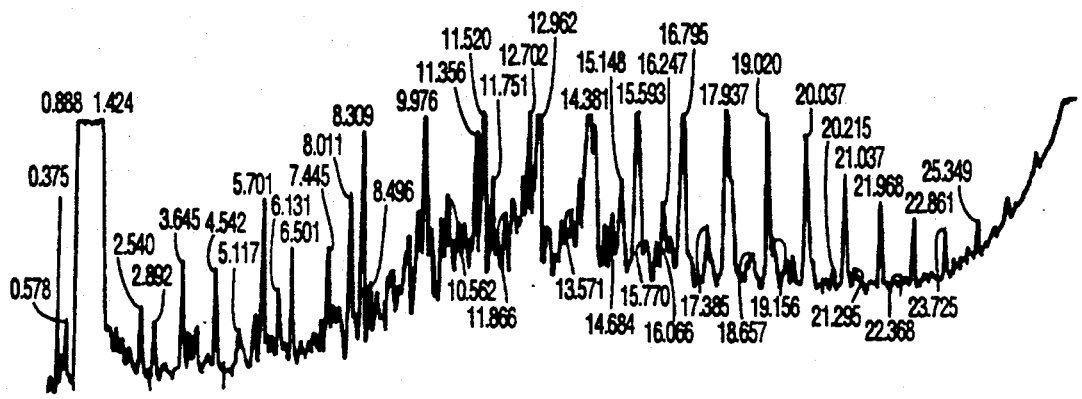
FIGS. 3A-3D show four chromatographs obtained upon analyses of liquids solvent phase samples containing oily material produced in Example 2.
Figure 3B:
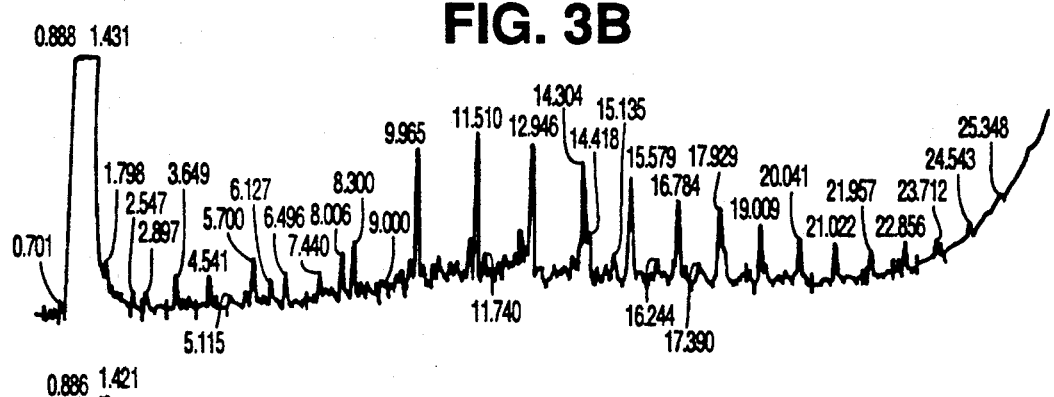
Figure 3C:
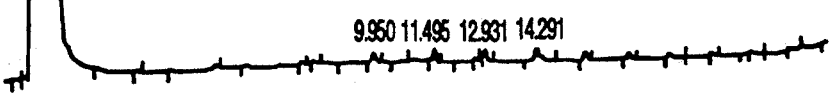
Figure 3D:
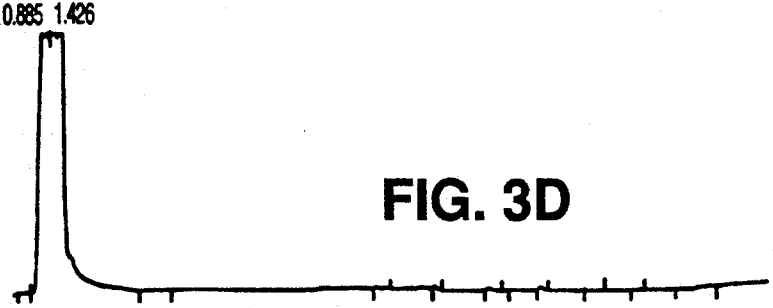

A difficult factor in the easy removal of oily organic materials from an oily substrate, which can additionally include solids, is the presence of water. If water were not present, the separation of the organic oily material could be accomplished by a simple solvent extraction or leaching treatment or washing of the solids with a solvent in which the organic oily materials were soluble. However, when water is present, the mixture is sometimes in the form of an emulsion presenting additional problems.

An emulsion is a mixture of two or more immiscible liquids, one being present in the other in the form of droplets, and emulsions frequently contain solid particulate material as a third ingredient such as the oily substrates described above. Generally, in emulsions an oily substance may either be dispersed in water (oil-in-water emulsion) or water dispersed in the oily substance (water-in-oil or an inverse emulsion), where the first phase represents the dispersed phase and the second the continuous phase.

In industrial effluent streams, for example waste effluent streams, wherein oily materials are designated for recycle or waste disposal, emulsions present particularly difficult treatment and separation problems, as the oily materials are trapped between emulsified droplets or particles making it very difficult to remove the substances by simple extraction processes. In order to extract such oily materials from emulsified mixtures, it is necessary to completely break these emulsions to facilitate the transfer of oily materials from the emulsion into a solvent for its removal. In oily substrates comprising organic oily material, water and solids, for example sludges, emulsions have made treatment processes thereof less effective and commonly present distinct separation problems which heretofore have prevented the use of solvent treatment for recycle or decontamination of oily substrates.

First, if a hydrophilic solvent is used with a sludge containing oily material and solids particles which tend to agglomerate or agglutinate as an example of an oily substrate, the solvent may have no physical effect on the solid particles and the solid particles may be easily phase separable. However, the liquids phase present and which comprises the oily material, water and the hydrophilic solvent which is usually infinitely soluble in water, is a very difficult mixture to separate cleanly, especially economically, into its component parts.

On the other hand, if a hydrophobic solvent alone is used, the solvent may cause the solids particles in the oily substrate to agglomerate or agglutinate in the presence of the water in the oily substrate. The agglomeration of the particles with a hydrophobic solvent due to the presence of water, prohibits contact of solvent with the solids present, effectively prohibiting any significant removal of oily material from the solids.

The present invention overcomes the aforesaid problems and provides a process for treating oily substrates comprising organic oily material and water and such substrates additionally comprising solids, and such oily substrates in emulsified form.

Some examples of oily substrates such as sludges which can be treated using the process of this invention include the following:

Oil and petroleum Refinery Sludges as Oily Substrates

Refinery sludges are often characterized by their source and can be generally described as follows:

Once-Through Cooling Sludge: This type of sludge accumulates in the bottom of tanks and heat exchangers were water is used for once-through cooling. These wastes may contain various amounts of hydrocarbons.

API Separator Sludge: This type of sludge includes solids which accumulate in the API Separator or other gravity-type separators during primary wastewater treatment. Refinery waste water streams for process water and contaminated storm water are usually connected to the API Separator. The quantity and quality of these sludges are dependent upon the crude oil characteristics, composition and quantity of process wastewater, spills and leaks, blowdown, refinery housekeeping, refinery size and age, and segregation of refinery oily drains. Oil content and solids levels can vary widely in such sludge, and can also include significant water content.

Air Flotation Sludge: This type of sludge is generated when solids are removed following wastewater treatment in separators in processes called dissolved air flotation (DAF) or induced air flotation (IAF).

Air flotation sludge is generated where air under pressure in circular or rectangular flocculation tanks brings the finely divided solids and oil droplets to the surface where they are skimmed off and disposed of. Many refineries use some type of chemical coagulant which is added to the flocculation tank. Factors which can affect the constituents of and quantities of this type of sludge are residence time, quantity and frequency of flocculating chemicals used; whether the float is recycled to oil recovery processes; and efficiency of API Separators used for primary oil/solids removal.

The float resulting from this process is a mixture of oil-water-solids from DAF and IAF units. These types of units are used to reduce the amount of oil and solids going to the biotreatment operation. Some DAF units use alum to assist in flocculation of the solids. Certain DAF and almost all IAF units use polyelectrolytes to flocculate the oil and solids. As is well known the components of a typical DAF or IAF sludge can vary widely depending upon diverse processing conditions.

Biological Solids: These types of solids comprise excess biological sludge that must be removed periodically from the treatment plant. The biosludge is usually dewatered prior to disposal, and dewatering may be preceded by digestion, usually aerobic. The constituents and quantity of this sludge depends on compositions and quality of wastewater treated, type of biological treatment, efficiency of prior treatment units, operating conditions and practices and type of dewatering or other treatment used prior to disposal.

Storm Water Silt: This type of silt considered herein as a sludge is collected in storm water setting basins and is periodically removed and disposed of. The amount and nature of this silt or sludge is dependent on plant housekeeping, amount of rainfall, amount of paved areas in the refinery, and segregation of surface drainage from non-process area streams.

Sump Sludge: This type of sludge comprises collections of silt, coke corrosion and oily material.

Storage Tank Bottoms: This type of sludge involves solid settlement from incoming crude oil that accumulates at the bottom of storage tanks. The bottoms are generated when the tanks are cleaned. Constituents in the bottoms vary with the type of crude oil as well as the shipping and handling methods of production and transportation. Crude Sludge Bottoms usually contain a mixture of rust, iron, sand, water, and settlement along with oil and wax. Distilled and residual storage tank bottoms vary with the type of product stored. The constituents vary depending on the type of crude, recovered oil processing methods, in-tank mixing, type and quantity of chemical additives, plant and tank metallurgy, type of product treatment used, and type of process used in the producing products.

Oily substrates as effluent steams and waste streams similar to those described above are also generated in oil fields during oil drilling and production. Crude is stored in tanks which must be cleaned and the resulting tank bottoms include a combination of crude oil, silt, metals and a large amount of water which collect in the tanks.

On review of the types of industrial sludges set forth above, petroleum and drilling sludges in particular exemplify oily substrates can be treated by the process of this invention and comprise a mixture of water, oily material and solids in widely varying proportions. Often the water and oily material will be present in large amounts. However, the water content of such oily substrates is generally the predominant component.

An oily substrate which can be treated with the process of this invention may have a water content of about 2% to about 95% by weight, but more typically has a water content from about 5% to about 90% by weight, and most typically about 40% to about 80% by weight of the oily substrate; and an oil content of from about 0.01 to about 90 weight % and more typically from about 0.02 to about 50 weight %, and most typically from about 5 to about 20% by weight.

In one embodiment the treating process of this invention is effective to remove oily materials from the solids present in an oily substrate, for example a sludge, for recovery and safe disposal. In the case when the oily material is present in large quantities, the recovered oil or hydrocarbon may be passed into refining for further processing and recovery. The amount of the solids in an oily substrate which can be treated in accordance with this invention, such as, for example a sludge, is not critical and may vary widely from less than about 0.01 to greater than about 90 weight % and typically from about 5 to about 25 weight percent, such as in the case of API Separator sludge.

These solids can include solids of a soil like nature and finely divided solids materials recovered from air flotation separation processes, whether dissolved (DAF) or induced (IAF) air flotation. The solids treated in this process can also include materials such as silt and coke, metal oxide corrosion from the tanks and piping involved and, in the case of drilling rigs, the solids from wading and drilling muds. Often the solids may include metal particles such as lead, nickel, barium, chromium, selenium, arsenic, mercury and the like, and salts thereof.

Further examples of oily substrates which can be treated using the process of the present invention include effluent and waste streams from well injection streams, and effluent and waste streams associated with primary, secondary and tertiary oil recovery processes in general; pit, pond and lagoon disposal wastes; and soil solids containing organic and/or hazardous compounds.

Oily materials which can be present in the oily substrates which can be subjected to the process of this invention can be crude oil directly from the well head; organic hydrocarbons typically produced in industrial processes such as in the drilling, refining and the petrochemical industry, and hazardous materials, for example, chlorinated organics such as polychlorinated biphenyls, benzene, toluene and halogenated derivatives of such compounds. In a preferred embodiment of the process of this invention refinery sludges containing various oily and/or hydrocarbon waste streams are successfully treated thereby. Sometimes the material being treated is one which has worked its way into a ground water sump or blowdown tank in a refinery. The source of the water which is present in the sludge can be, for example, rain water collected in a surface water sump or cooling water from heat exchangers or water used in scrubbers to remove pollutants from air steams and water employed in chemical processing in general.

In many instances the water and the oily material in an oily substrate may be emulsified and present particular difficulty in ordinary cleanup systems. Thus, in another preferred embodiment the process of the present invention can be successfully employed to break emulsions and to separate and remove organic phases, for example organic recycle or hazardous waste streams, from aqueous emulsion mixtures which may also contain solids. The solvent for the oily materials employed in this invention to treat such oily substrates discussed above is a hydrophobic solvent which ranges in water solubility from being sparingly soluble in water to substantially water insoluble. The term "sparingly soluble" is used to characterize a solvent under normal ambient conditions having a degree of solubility which requires on the order of about 30 to 100 parts solvent needed to dissolve one part of a substance. This degree of solubility, however, may increase under elevated temperatures and pressure. The solvents used in the process of the present invention are primarily hydrophobic solvents which result in a distinct interface between organic and aqueous phases when mixed.

Hydrophobic solvents which are preferred in the practice of the present invention are hydrocarbon solvents having a density which enhances the phase separation of mixtures of organic materials and water which may also contain solids. Generally solvents with low densities of from about 0.5 to about 0.9 are preferred with those having a density of from about 0.6 to about 0.8 being most preferred. Most hydrocarbons are excellent solvents for the oily material present, including such oily material as hydrocarbonaceous oils and halogenated organics such as PCBs, and will easily extract oily materials from the highly dispersed solid particles in the oily substrate being treated or from a broken emulsion of oily materials and water.

In addition to good solvation power for the oily materials present, the solvent employed in the process of the present invention should have a boiling point lower than the boiling point of water, at atmospheric pressure, preferably a boiling point in the range of from about 0° C. to about 100° C. and most preferably from about 30° C. to about 70° C. to facilitate separation of the solvent from the oily materials, for example, separated from a sludge, for example, by distillation, for recycle. A specifically preferred group of hydrophobic solvents are the ($C_1$ to $C_{10}$) aliphatic, linear, branched or cyclic saturated hydrocarbons, particularly $C_5$ to $C_{10}$ hydrocarbons such as pentane, hexane or heptane and the like. Specific solvents especially suitable for hydrocarbons such as PCBs as oily materials present are propane, butane, pentane, hexane, heptane, octane, nonane, cyclopentane, and cyclohexane. Other straight chain or branched chain aliphatic or aromatic solvents, such as benzene, toluene, and xylenes and the like may be used in the process of the present invention. Halogenated derivatives of the aforesaid solvents are also useful in this invention, such as, for example, methylene chloride, tri- and tetra chloroethylene. Hydrocarbons such as $C_1$ to $C_4$ alkanes such as methane, ethane, propane, butane, which are gases at normal temperatures and pressures but may be used under sufficient pressure to be in liquid form, are preferred in the practice of the present invention.

The amount of solvent employed is not critical to the present invention and can vary widely, but is usually from about 0.3 to about 10 times the weight of the oily substrate being treated and preferably from about 0.5 to about 5 times and, most preferably from about 1 to about 3 times the amount of the oily substrate being treated. As the solvent to oily substrate ratio is increased the time required for phase differentiating interface formation between organic and aqueous layers and phase separation is decreased and the treatment efficiency is increased. As solvents which are easily recovered are generally employed, savings in cycle time may justify solvent usage in liberal amounts.

Not only is the selection of the solvent for the oily material present in the oily substrate being treated important, but in accordance with the present invention, a comminuting surfactant is also employed. A "comminuting" surfactant is one which, when included in the solvent, essentially neutralizes the agglomerating and the shielding effect of the water present, even when the water is present in large amounts in the oily substrate. While not desiring to be bound by theory, it appears the water shields the solids and oily materials from contact with the solvent used. The comminuting surfactant disperses the solid mass and bridges the water barrier to extract the oily materials into the solvent. The action of the comminuting surfactant in conjunction with a desired pH and added flocculent, as hereinafter explained in more detail, and the ratio of solvent to oily substrate enhances removal of oily materials from the solids present speeds and improves separation and improves solvent recovery.

It is the solvent/comminuting surfactant combination which treats the oily substrate to produce phases including a comminuted mixture of a dispersed, flowable, and discrete solids, water and solvent and makes the separation of oily materials from the solids feasible.

In contrast to comminuting surfactants, certain surfactants in combination with solvents, when contacting a solid, such as soil or sludge particles, may cause swelling, clumping, and thickening of the mixture and are referred to herein as swelling surfactants. The physical mixture becomes similar to a water and clay mixture and is characterized as agglomerated or agglutinated. The mixture expands, clumps, thickens and is sticky. Swelling is accompanied by absorption of the solvent into the solid/water/surfactant mixture, thereby preventing recovery of the solvent.

In the case of emulsions, for example of an oily substrate or organic material contained therein with water e.g. (a typical oil-in-water emulsion), or such emulsions additionally containing solids, the comminuting surfactant in the presence of solvent facilitates breaking the emulsion and the subsequent phase separation between the aqueous phase and the solvent, and thus facilitates the transfer of organic compounds of interest, for example, organic contaminants, from the emulsified mixture into the solvent for separation and removal.

The term "phase differentiating interface" is used herein to describe a discrete boundary between different phases.

The appropriate selection of a comminuting surfactant can easily be made by shaking a sample of the oily substrate to be treated in a flask with the solvent and surfactant considered for use and observing the formation of a phase differentiating interface and comminution of the solids in the mixture if present and/or the breaking of an emulsified mixture.

Suitable surfactants for use in the process of the present invention are therefore those which effectively comminute the oily substrate, and cause a phase differentiating interface to be formed such that, for example, the solids and liquids phases are separable or, for example, an oil-in-water emulsion can be broken. Moreover, the preferred surfactants also have sufficient water solubility to enable removal of the oily materials from the solid particles present in the oily substrate into the solvent and/or to successfully break an emulsion. The surfactant therefore must have some water solubility or, may be, completely water soluble to provide a bridge or conduit between the solid particles or emulsified particles and the solvent whereby the oily material is extracted through the water barrier which surrounds the oily materials present in the oily substrate. While not desiring to be bound by theory, it is believed that the oily material adheres to the surface of solid particles or components in the oily substrate. The water present, therefore, acts to virtually encapsulate the oily material adhered to the solid particle surface comprising an emulsified particle or an emulsified droplet comprising oily material, and therefore, it is necessary to provide a bridge or conduit across this water barrier so that the treatment of the oily material adhering to the solid particles or in the form of emulsified droplets can take place. Such surfactant characteristics and the water solubility of the surfactant therefore result in an effective system for treatment of oily substrates.

A surfactant by definition is a substance which alters the surface tension of water, and there are traditionally four types: nonionic, anionic, cationic and amphoteric. Surfactants in general are compounds which exhibit both hydrophilic and hydrophobic properties. All of the aforesaid types of surfactants are useful in the present invention.

The comminuting surfactant is generally incorporated into the solvent for the treatment of an oily substrate but can be added directly in part or in whole to the oily substrate if desired. It is only necessary that the contacting of an oily substrate with the solvent be in the presence of the surfactant to achieve the advantages of this invention.

Although the choice of comminuting surfactant and the amount employed will vary widely depending upon the composition of the oily substrate to be treated, and other variables such as the solvent employed, preferred comminuting surfactants for use herein are acidic in a 2 weight % water solution, and the pH of the surfactant solution will preferably range from about 1 to about 8.

In general, suitable amounts of surfactant may range between about 0.05 and about 20 wt. % of the oily substrate being treated. More preferably the amount of surfactant is between about 0.1 and about 15 wt. %, and the most between about 0.5 and about 8 wt. % of the oily substrate being treated. Although incorporating the surfactant into the solvent is preferred in the process of the present invention, the surfactant can be added to the water phase or directly to the oily substrate as noted above. The amount of water will affect the ease with which the water barrier can be broken, and thus the surfactant and amount thereof added to the oily substrate will be influenced by the amount of water present in the oily substrate.

Specific examples of some comminuting surfactants which may be used in the process of the present invention are set forth hereinbelow. Moreover, from the disclosure of specific examples from each type or class of these surfactants, and the examples which follow, it will be recognized by persons skilled in the art that only routine experimentation is necessary to arrive at other suitable comminuting surfactants which may be used to successfully treat particular oily substrates in accordance with the process of the present invention.

Specific examples of comminuting nonionic surfactants useful herein are compounds which are formed by reacting alkylphenols, particularly octyl- or nonylphenols, with ethylene oxide. This class of nonionic surfactants are well known by the skilled artisan including their properties and the usefulness associated with particular amounts thereof depending upon their contemplated use. In general, the average number of ethylene oxide molecules per molecule of alkylphenol is between 1 and 6 molecules per molecule of octyl- or nonylphenol. The hydrophilic-lyophilic balance, HLB, increases as the number of ethylene oxide molecules increase. When the number of ethylene oxide molecules is between 1 and 4, the surfactant is immiscible in water, whereas if the average number of ethylene oxide molecules attached is between 4 and 6, the surfactant is dispersable in water, and with 8 or more ethylene oxide molecules, the surfactant is soluble in water.

Preferred nonionic surfactants are those which are much more soluble in the solvent than the water. Suitable nonionic surfactants have an HLB between 4 and 10. Particularly preferred nonionic surfactants have an HLB between 7 and 10. These nonionic surfactants have been found to be most effective when used in amounts of about 0.5 wt. % to about 8 wt. % and preferably about 1.0 wt. % to about 6 wt. % based on the weight of the oily substrate being treated. Greater amounts can be used but the nature of the improvement is not necessarily enhanced further.

Other nonionic surfactants may include ethylene oxide adducts of fatty acids, amides or other substances and their derivatives with ethylene oxide.

Specific comminuting cationic surfactants are formed from quaternary ammonium chloride derivatives of polypropoxy tertiary amines. This class of cationic surfactants, the properties thereof and the usefulness thereof given a particular application and contemplated end result are also well known to the skilled artisan. Preferred cationic surfactants of this type for use herein are quaternary ammonium salts with a pH less than about 5.5 and a molecular weight of at least about 1200 and preferably between 1600 and 2500. and are of the general formula

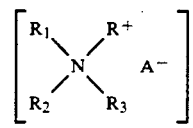

where

R is a $C_1$ or $C_2$ alkyl group, preferably a methyl group;

$R_1$ and $R_3$ are each a $C_1$ to $C_4$ lower alkyl, preferably an ethyl group;

$R_4$ is a polyoxypropylene group having an average molecular weight of from about 400 to about 2000; and A is a halogen atom, preferably a chlorine atom.

The molecular weight of these cationic surfactants depends on the $R_2$ group. The molecular weights of these compounds are generally between 600 and 2500. In general, the water solubility of these compounds decreases as the molecular weight of the molecule increases.

Other suitable cationic surfactants may include aliphatic (fatty) amines and their derivatives, homologues of aromatic amines having fatty acid constituents, fatty amides derived from disubstituted amines, quaternary ammonium compounds, amides derived from amino alcohols and their quaternary ammonium derivatives, quaternary ammonium bases derived from fatty amides of disubstituted diamines, basic compounds of sulfonium, phosphonium and antimonium, dimethylphenylbenzyl ammonium chloride, urethanes or basic salts of ethylene diamine, polyethylene diamines and their quaternary ammonium derivatives, polypropanol polyethanolamines and various cationic-active compounds. A preferred cationic surfactant for use in the present invention is EMCOL CC-42 by Witco Chemicals which is a quaternary ammonium salt.

Effective anionic surfactants are those having a pH less than about 7, preferably less than about 5. The active ingredient in other comminuting anionic surfactants which may be used in the present invention can be sodium dioctylsulfosuccinate.

Specific examples of suitable anionic surfactants include products obtained by direct sulfonation of fatty acids without previous treatment; products obtained by esterification of fatty acids with sulfonated monovalent alcohols; sulfonated derivatives of fatty acid esters of low molecular weight; sulfonated products of fatty amides; products obtained by condensation of fatty acid chlorides with amines; sulfonation products of fatty acid nitriles or aldehydes of ketones or other natural or synthetic alcohols; and products obtained by use of mineral esterification agents other than sulfuric acid and sulfonated aromatic compounds.

A specific preferred example of an anionic comminuting surfactant is octylphenoxypolyethoxyethylphosphate (a phosphated ethylene oxide adduct of octylphenol), a material commercially available from Rohm and Hass Company under the trademark "TRITON QS-44". This anionic surfactant may be in a free acid form or as an alkali metal salt, preferably the sodium salt.

While specific examples of suitable comminuting nonionic, cationic, and anionic surfactants are described above, surfactants which may be used in the present invention are not limited thereto. The foregoing illustrates that slightly water soluble, or soluble surface active agents or surfactants usually with a pH less than about 5.5 are preferred for use in the present invention.

An important aspect of and a preferred embodiment of the process of this invention is the adjustment of the pH of the oily substrate to about pH 7 or less. It has been found that in the practice of the present invention the pH of the oily substrate affects both the extraction efficiency and the phase separation characteristics, and thus the settling rate of solids in the mixture of oily substrate and solvent/surfactant, and also the time needed to break an emulsion. Acidic extraction mixtures are generally preferred. However, the optimum pH of an oily substrate to be treated can be determined by routine experimentation to produce satisfactory extraction results and settling characteristics, and/or emulsion breaking properties. The adjustment of the pH of the oily substrate, for example, by addition of an acid to the system can be conducted either prior to the introduction of the solvent/comminuting surfactant mixture or can be conducted after the solvent/surfactant has been initially contacted with the oily substrate. This aspect of the invention is described and illustrated in more detail below.

Once the solvent and comminuting surfactant treating ingredients added to the oily substrate, the resultant mixture is agitated or mixed to provide intimate contact with the components of the oily substrate. Thus, through this treatment the oily materials are contacted with the solvent in the system. Suitable mixing takes place for a period from less than about 0.1 minutes to in excess of about 10 minutes depending upon the nature and volume of the oily substrate being treated for a particular time. Of course, the lesser the amount of oily substrate being treated, the shorter the mixing time necessary for the complete contact and comminution of any agglutinated solids which are present in the oily substrate. In an emulsion, the oily material to water ratio may influence the mixing time necessary for breaking the emulsion, and the solvent extraction of oily material present. A preferred time for mixing is from about 1 to about 5 minutes.

Table I below illustrates the effect of acid selection and amounts added to a particular sludge (DAF) in hexane and is presented to illustrate how acid selection can be made. The results in Table I show that a strong inflection point is produced as the pH is reduced with the rate of change in settling time diminishing as higher amounts of acid are added so that the pH of the system becomes more acidic. Table I and FIG. 1 of the accompanying drawings both show a characteristic inflection point, or dramatic change in phase in settling rate, at some point during pH adjustment. This point may vary in terms of absolute pH value. The pH, or amount of acid or base added, if pH adjustment is needed, have a dramatic effect on the settling rate of the solids. The rate and degree of settling are an advantageous characteristic of the process of this invention. Also, Table I indicates a variety of different acids are equally effective in improving the settling rates.

TABLE I

SETTLING RATES OF DAF SLUDGE IN HEXANE WITH DIFFERENT ACIDS

| % Acid in Sludge | ACID | | | |
|---|---|---|---|---|
| | $H_2SO_4$ (95.6%) | HCL (37%) | Nitric (96%) | Phosphoric (85%) |
| 0 | 51 | 51 | 51 | 51 |
| 1 | 20 | 25 | 23 | 23 |
| 2 | 13 | 13 | 9 | 14 |
| 4 | 6 | 6 | 6 | 11 |
| 5 | 4 | 5 | 5 | 10 |

Note: The values in Table I above were obtained at a solvent to sludge volumetric ratio of 2:1. 1% of a comminuting surfactant EMCOL CC-42 (Witco), (described hereinafter) based on sludge weight was also added to the mixture.

Suitable examples of inorganic acids which can be used for pH adjustment include those described in Table I, and can additionally include, for example, perchloric acid, hyphophosphorous acid, and the like.

Organic acids can also be used for pH adjustment if desired or in addition to the use of inorganic acids as described above. Suitable organic acids include carboxylic and sulfonic acids such as acetic acid, propionic acid, and the like.

Once the surfactant, solvent and acid ingredients are added to the oily substrate, the mixture is agitated or mixed to provide intimate contact with the components of the substrate and thus transfer of the oily materials into the liquids solvent phase. Once mixing is complete, phases are allowed to separate, and if present dispersed solids settle out. In the case of an emulsion, the emulsion must first be broken and phase separation allowed to occur to permit solvent extraction of oily materials in the resulting organic phase. A feature of the process of this invention and a great advantage thereof are that the phase separation/settling occurs very quickly when the comminuting surfactant is used with the sparingly soluble solvent, particularly at a pH of 7.0 or less, with the ratios of solvent to oily substrate as set forth herein.

For an economical process, it is preferred to separate the solvent from the oily material after phase separation, and this can be accomplished by suitable conventional separation techniques. Distillation is one manner of separating the solvent from the oily material, but chemical methods may be also used. The separation of the solvent may also be accomplished by physical processes such as precipitation, membrane processes or ion exchange for reuse.

Temperature can also be an important factor in improving the treatment efficiency of removing oily materials from the oily substrate. The effect of temperature in improving the treatment efficiency in the process of the present invention is two-fold. First, an increase in temperature increases the desorption rate of the oily materials adhered to solid particle surfaces thereby releasing the oily materials into the liquids phase. Second, an increase in temperature helps reduce the surface tension of water or the interfacial tension between the water present, for example, in sludge, and the solvent used in the process of the present invention. Both of these factors enhance the treatment efficiency to remove the oily materials from the oily substrate. Increased process temperature can also enhance the break-down of emulsions in accordance with the practice of the present invention.

The operating temperature range is generally influenced by the boiling point of the solvent used for the treatment of the oily substrate, and typically effort is made not to exceed the boiling point of the solvent selected for use in the process of the present invention. However, in a more preferred embodiment higher treatment efficiencies are achieved by operating the contacting step of the process of this invention under elevated pressures. Increasing the pressure on a liquid generally increases its boiling point and thereby its usable range in the process of this invention.

The process of the present invention is preferably operational at temperatures ranging from about 0° to about 250° C., more preferably from about 30° to about 150° C., and most preferably from about 50° to about 100° C.

The process of this invention can be operated in a batch mode, a semi-continuous mode or a continuous mode.

In the batch mode of operation, the solvent is contacted with the oily substrate in the presence of the comminuting surfactant, and preferably at a desired pH, for example, in a mixer/settler tank. The mixture is agitated for a specific time during which time the oily materials are transferred from the oily substrate into the liquids solvent phase. After equilibrium is reached, the agitation is stopped and as a result of the components used in the process of the present invention at least one phase differentiating interface is formed. This results in the mixture being separable based on the phases present, for example, into a solids phase and a liquids phase or in the case of an oil-in-water emulsion, an organic and an aqueous phase.

The separation of the phases, for example, the solids phase from the liquids phase, can be accomplished by various conventional methods such as gravity settling, centrifugation, hydroclone settling, or a combination thereof.

In some preferred embodiments where a mixture to be treated contains oily materials adsorbed or absorbed on solid particulate material, after dispersion and extraction of the oily material in accordance with the invention via a solvent/comminuting surfactant solids settling of particulate matter can be accelerated by the addition of a flocculant.

Suitable flocculents for use in the practice of this invention can be inorganic or organic and include any material that enhances aggregation of treated solid particulate matter in this invention to form a floc and thus enhance settling of solids and phase separation.

Some examples of inorganic materials useful as flocculants herein include water soluble aluminum salts, alum (aluminum sulfate hydrate), soluble inorganic iron salts and lime, and other conventional polyelectrolyte flocculants.

Organic flocculants can be cationic, anionic or nonionic. Examples of cationic flocculants useful in this invention include poly(ethylenamide), poly(2-hydroxypropyl-1-N-methyl ammonium chloride), poly(2-hydroxypropyl-1,1-N-dimethylammonium chloride), poly[N-(dimethylaminomethyl)-acrylamide], poly(2-vinylimidazolinum bisulfate), poly(diallyldimethylammonium chloride), poly(N,N-dimethylaminoethyl methacrylate), and poly[N-(dimethylaminoproply)-methacrylamide]. Examples of some anionic flocculants include poly (sodium or ammoniumacrylate), and poly(sodium styrene sulfonate). Examples of some nonionic flocculants include polyacrylamide, poly(ethylene oxide) and poly(vinylpyrrolidine).

Natural and synthetic gums and various water soluble gums in general, such as, for example, quar gum, locust bean gum, gum carrageenan, gum arabic, gum ghatti, gum karaya, gum tragacanth, xanthan gum and the like are also useful as flocculants in the practice of this invention.

After sufficient separation between the phases, for example, the solids phase and the liquids phase, or an organic phase and aqueous phase in an oil-in-water emulsion, is accomplished, the organic liquids phase containing the oily material is separated and is directed into a liquid separation device, such as, for example, a distillation column or any other separation mechanism, where a solvent can be recovered for recycle and reuse in the treatment process if desired. For higher treatment efficiency for the oily substrate, fresh solvent is added in the contacting step with partially cleaned oily substrate in the contacting step and the above procedure is repeated. The advantage of a batch operation is high efficiency of oily material removal in each contacting step conducted.

The process of the present invention can also be conducted in a continuous mode in which solvent and oily substrate are contacted with each other continuously during which time oily materials are continuously transferred from, for example, a solids phase into a liquids phase. More specifically, the continuous mode can be practiced using a countercurrent extraction unit where the oily substrate being treated and the solvent travel continuously and countercurrently. As the oily substrate travels through the contacting unit, the amount of oily material present in the oily substrate is reduced and the amount of the oily materials present in the liquids-solvent containing phase increases. The advantage of continuous countercurrent operation is a significant reduction in the volume of solvent used and simplicity in operation.

The amount of surfactant employed in the process of the present invention is also influenced by whether the process is conducted in a batchwise or continuous mode.

In a batch mode of operation the surfactant can be added to the batch treatment tank in a first stage. If the surfactant is only soluble in the solvent to be used, the surfactant will be removed from the system with the liquids phase including the solvent where the liquids phase is separated from, for example, a solids phase, at the end of the contacting. More surfactant may needed to be added to the mixture in a second contacting, if such is conducted, to again disperse the oily substrate particles. The same is true for any subsequent contactings conducted is such are repeated. If a water soluble surfactant is used, upon separation of the liquids phase including the solvent used from the solids phase of the completion of the contacting, the surfactant will remain, for example, with the solids phase or an aqueous phase. Therefore, no additional surfactant or minimal additional surfactant may need be added to the mixture being contacted if subsequent contactings are conducted. Finally, if a surfactant which is mutually soluble in the solvent and water is used in the process of this invention, the amount of surfactant which is added in any subsequently conducted contacting in accordance with the present invention is a make up amount equivalent to the amount of surfactant which was soluble in the liquids phase during the previous contacting stage.

In the continuous mode of operation, if a solvent soluble surfactant is used, routine experiments can be conducted to determine the continuous rate of surfactant removal and surfactant needs to be added continuously to the system to main a necessary amount of surfactant in the mixture during the contacting. However, if a water soluble surfactant is used, no further addition of surfactant may be necessary as surfactant will remain with the solids or aqueous phase and not be continuously removed in an organic liquids phase containing materials from the oily substrate and solvent.

In another aspect of the present invention in treating oily substrates containing solids, due to the action of the treating solvent/comminuting surfactant mixture thereon in accordance with this invention at a desired pH, solid material behaves in a fluid-like manner such that liquid-liquid extraction apparatus can be surprisingly and advantageously employed herein to treat such solids. Further, because of the fluidized nature of solids-containing oily substrate, and its advantageous processing in liquid-liquid extraction apparatus, a high throughput can be obtained, and additionally simplicity in equipment design and reduction in equipment size can be achieved.

The results in Table II shown below were obtained by physically characterizing a number of comminuting surfactants useful in the process of the present invention using well-known methods. To measure these properties, a 2 wt. % solution (unless otherwise specified) of the surfactant in water was prepared. The surfactant was classified as soluble, partially soluble, dispersible, partly dispersible, or insoluble.

The cationic surfactants tested were all liquid-form quaternary ammonium chloride derivatives of polypropoxy tertiary amines having a formula as set forth in the description hereinabove as to cationic comminuting surfactants which can be used in this invention. Each are a light amber oily liquid having a specific gravity of about 1.01 and each surfactant differs in the length of the polyoxypropylene group so that they have different average molecular weights. Each is commercially available from Witco Chemical under the trademark "EMCOL". More specifically, exemplified is a quaternary ammonium chloride derivative having an approximate molecular weight of 600 and commercially available under the trademark "EMCOL CC-9"; such a derivative having an approximate molecular weight of 1600 and commercially available under the trademark "EMCOL-CC-36"; and such a derivative having an approximate molecular weight of 2500 and which is biodegradable and is commercially available under the trademark "EMCOL CC-42".

An example of an anionic surfactant found to be comminuting and suitable for use herein is octyl phenoxypolyethoxyethylphosphate anionic surfactant, which has an amber color and a viscosity of about 8000 centipoise at 25° C. It is commercially available from Rohm and Haas under the trademark "TRITON QS-44". Another surfactant found to be comminuting and useful herein is supplied as a 60% solution in a mixture of equal parts of isopropyl alcohol and water wherein the active ingredient is sodium dioctylsulfosuccinate, and is commercially available from Rohm and Haas under the trademark "TRITON GR-5M".

Suitable nonionic surfactants evaluated are adducts of octylphenol or nonylphenol with ethylene oxide. These surfactants differ in the length of the polyoxyethylene chain. A product with 1 mole of ethylene oxide is commercially available from Rohm and Haas under the trademark "TRITON X-15". A product with 3 mols of ethylene oxide is commercially available as "TRITON X35", a product with 5 mols of ethylene oxide is commercially available as "TRITON X-45", and a product with 6 mols of ethylene oxide is commercially available as "TRITON N-60".

Other examples of suitable nonionic comminuting surfactants are polyethoxylated nonylphenols with average ethylene oxide contents of 4–12 moles per mole of nonylphenol and commercially available from Henkel Corporation. Further examples include a product with 4 mols of ethylene oxide and available under the trademark "HYONIC NP-40" and another with 6 mols of ethylene oxide and available under the trademark "HYONIC NP-60".

Two anionic sodium alkyl arylpolyether sulfonate surfactants commercially available from Rohm and Haas under the trademark "TRITON X-301" and "TRITON X-200" were found not comminuting surfactants in this example at the pH indicated. The characteristics of these surfactants are set forth in Table III below. As is shown below in Table III, a non-comminuting surfactant lacks ability to disperse the oily substrate in the solvent/surfactant system and thus does not facilitate extraction of oily material from an oily substrate into an extraction solvent.

The treatment efficiency of the comminuting surfactants in the process of the present invention is defined with respect to two criteria: first, the amount of surfactant necessary to achieve a certain level of oily material removal; and second, the overall efficiency of the process defined as percent removal of oily material from the oily substrate. Column 6 in Tables II and III, respectively, rate the treatment efficiency of comminuting and non-comminuting surfactants which were studied in the process of the present invention. A rating of "excellent" means that the surfactant was useful in a very small quantity and the treatment efficiency was very high. A rating of "none" means that the surfactant had no comminuting capability.

TABLE II

PHYSICAL CHARACTERISTICS OF SURFACTANTS

| Trade Name | Surfactant Type | Soluble in water | Comminuting | pH of 2% Solution | Extraction Efficiency |
|---|---|---|---|---|---|
| Emcol CC-9 | Cationic | S | Yes | 6 | F |
| Emcol CC-36 | Cationic | Pt. S | Yes | 4.5 | G |
| Emcol CC-42 | Cationic | Pt. S | Yes | 4 | VG |
| Triton QS-44 | Anionic | S | Yes | 2 | E |
| Triton GR-5M | Anionic | S | Yes | 5 | VG |
| Triton X-15 | Nonionic | D | Yes | 5 | F |
| Triton X-35 | Nonionic | Pt. D | Yes | 4.5 | G |
| Triton X-45 | Nonionic | D | Yes | 6 | G |
| Triton N-60 | Nonionic | D | Yes | 6 | P |
| Hyonic NP-40 | Nonionic | I | Yes | 7* | F |
| Hyonic NP-60 NP-60 | Nonionic | D | Yes | 7* | P |

*pH in 1% solution.
S = Soluble; I = Insoluble; Pt. S = Partly Soluble; D = Dispersible; Pt. D = Partly Dispersible; P = Poor, F = Fair, G = Good, VG = Very Good, E = Excellent

TABLE III

PHYSICAL CHARACTERISTICS OF SURFACTANTS

| Trade Name | Surfactant Type | Solubility in Water | Comminuting Surfactant | pH of 2 wt % Solution | Treatment Efficiency |
|---|---|---|---|---|---|
| Triton X-301 | Anionic | S | No | 8** | None |
| Triton X-200 | Anionic | S | No | 8** | None |

**pH in 5% solution.
S = Soluble; I = Insoluble; Pt. S = Partly Soluble; D = Dispersible; Pt. D = Partly Dispersible; P = Poor; F = Fair; G = Good; VG = Very Good; E = Excellent While other attempts to extract oily materials from oily substrates have met with difficulty because of lack of phase separation ability, it has now been discovered according to a preferred embodiment of the present invention that by adjusting the pH of an oily substrate to about 7 or less, preferably from about 2 to about 6, and most preferably from about 3 to about 5, a significant reduction in the settling time for solids contained within an oily substrate can be obtained.

The order of addition of the solvent/comminuting surfactant and acid, for example, to a contaminated sludge, is not limited and any addition order can be used. However, in some instances it has been found that pretreatment of an oily substrate by adding acid to adjust the pH thereof has desirably resulted in a water phase separation of the mixture whereby significant amounts of water could be removed prior to treatment. On the other hand, the solvent and comminuting surfactant may be first added to the oily substrate and the acid may be added last or the solvent and acid added together and the comminuting surfactant last added. The effect of reducing the pH of the oily substrate on the settling time is illustrated in FIG. 2 of an API sludge as an oily substrate. As shown in FIG. 2, the reduction of the settling time from a pH of 11 to a pH of 7 is approximately a ten fold reduction in settling time. The reduction in settling time for a pH of 4.5 as compared to a pH of 7 is another factor of approximately two. If the pH is reduced to a pH of about 2, an additional approximate reduction of a factor of about two is achieved. Thus, the pH is adjusted to a pH of preferably below 7 and especially preferably to a pH range of about 4 to 5.5.

Examples which provide data for FIG. 1 are set forth hereinafter together with other examples illustrating the present invention in greater detail. The examples which follow are offered for illustration are not to be considered a limitation of the scope of the present invention. Unless otherwise indicated herein, all parts, percents, ratios and the like are by weight.

EXAMPLE 1

An oily substrate, identified as Sludge I, which comprises approximately 50% water, 25% oily material and 25% solids (percent by weight), was treated. The oily material comprised different types of hydrocarbons, such as aliphatic, unsaturated and aromatic hydrocarbons.

In this treatment, 10 grams of Sludge I which contained about 5 grams of water, 2.5 grams of solid and 2.5 grams of oily material were placed in a bottle. To the sludge was added 0.1 gram or about 1% by weight thereof, of a cationic surfactant having an average molecular weight of 2500, commercially available from Witco Chemical under the trade name "EMCOL CC-42". In addition, 20 grams of hexane was added. The bottle was shaken and a very dark mixture resulted. After about 7 minutes, a phase differentiating interface formed and the phases separated. A liquids phase which contained most of the oily material had a very dark color. The liquid phase was decanted from the solids phase and this separation constituted one containing treatment stage. The liquids phase obtained was diluted with hexane and gas chromatographically (GC) analyzed. It was found that more than 80% of the oily materials was transferred into the hexane solvent liquids phase.

To the resultant solids so treated in this first stage was added 20 grams of hexane. No surfactant was additionally added. The bottle was shaken for about 30 seconds and the mixture allowed to separate. Phase differentiating interface formation and phase separation was much quicker in this stage in that it took about two minutes for the phases to separate. After the phases had separated, the liquids phase with the solvent was then decanted off and this constituted a second treatment stage. The procedure of adding 20 grams of hexane to the solids phase was repeated 5 times and after shaking the bottle each time with the fresh hexane added, interface formation and phase separations occurred more quickly. After each treatment stage, a sample of the liquids solvent phase comprising the hexane was taken for gas chromatographic analysis. Reference is made to FIG. 3 which shows 4 chromatographs of samples removed in the first four treatment stages. The peaks are not totally representative of the concentration of each of the organic components since the samples from the first two treatment stages were diluted with hexane whereas the sample run in the last chromatograph was not diluted and represents the concentration of the hydrocarbons present as oily materials.

EXAMPLE 2

In the treatment, 10 grams of a sludge, identified as Sludge II, as an oily substrate was treated except that the surfactant used was an anionic surfactant commercially available from Rohm and Haas under the trademark "TRITON QS-44". As in Example 1, to the 10 grams of Sludge II were added about 0.1 grams (or 1% by weight) of the surfactant, the anionic surfactant "TRITON QS-44", and further 20 grams of hexane. The bottle was shaken vigorously and then allowed to stand for phase differentiating interface formation and phase separation. The first separation took approximately five minutes and this was considered the first treatment stage. The liquids phase was separated form the solids phase. To the solids phase obtained was added 20 grams of fresh hexane, the bottle was shaken, phase differentiating interface occurred and the mixture allowed to settle. This procedure was repeated for a total of four times or four treatment stages. The second stage of treatment required only two minutes for the phases to separate. Each time the settling time improved or shortened at each successive treatment stage. Again over 80% of the oily material was separated from the sludge in the first treatment stage and still further oily material was removed in the following treating stages; however, by the fourth stage no detectable quantity of oily material remained.

Figure 4A:
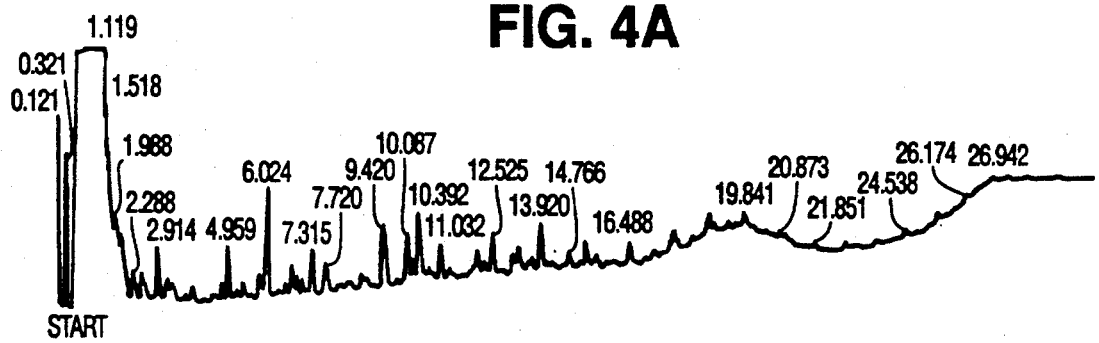
FIGS. 4A-4C show three chromatographs obtained upon analysis of liquids solvent phase samples produced in Example 4. (comparative example).
Figure 4B:
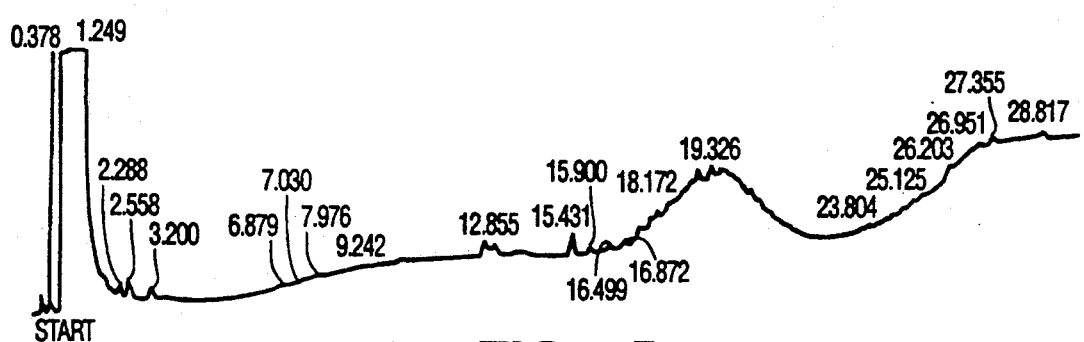
Figure 4C:
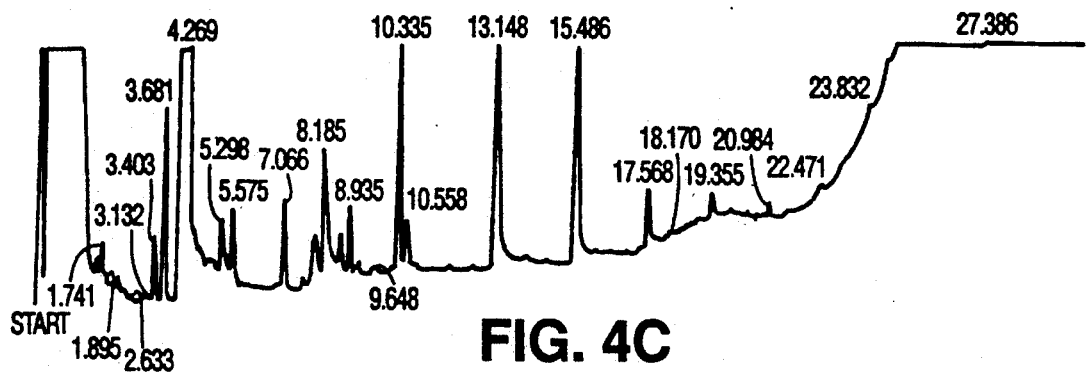

The liquids phase was passed through a gas chromatographic column and the chromatographs obtained are shown in FIG. 4. The samples removed from the liquid of the first and second treatment stages were diluted with hexane but the third and fourth samples were samples of liquids phase itself. In the third treatment stage, a few peaks in the chromatograph were observed but none of these peaks represent hydrocarbons which are regulated by E.P.A.

While the foregoing examples illustrate that the solids may be dispersed and materials comprising hydrocarbons can be successfully removed from the mixture, in each of the examples the time for the phase separation in the first treatment stage was five minutes or more.

The source of Sludge I and Sludge II was the same. According to the present invention it was found that the settling time of the solids phase from the liquids phase could be substantially enhanced by adjusting the pH. When the solvent/surfactant mixture is a hexane/surfactant mixture and the pH is adjusted to a pH of 7 or less, the settling time of basic API separation sludges may be improved by a factor of 10.

EXAMPLE 3 -

The data in FIG. 1, which illustrates the present invention, was obtained in accordance with the following procedures.

To five different and separate bottles was added 10 grams of sludge as an oily substrate. The sludge was composed of approximately 90 to 90% water, about 2½ to 5% hydrocarbon oils as oily material and 2½ to 5% solids (by weight). The pH of the sludge was measured and a pH of 11 was found. To four of the bottles was added concentrated sulfuric acid (98% by weight) in varying amounts such that the oily substrate was adjusted to a pH of 2.2, 4, 5, 7 and 9. No acid was added to one of the bottles which contained sludge with a pH of 11. To all five of the bottles containing these oily substrate samples was added 20 grams of hexane and 0.1 grams of surfactant. Each sample was shaken for complete mixing and contacting of the sludge with the solvent/surfactant and then each sample was allowed to settle. The time of settling was recorded using a stop watch. The time of settling of each of the samples was then plotted as shown in FIG. 1.

As shown in FIG. 1, two distinct regions exist. A first region comprises a pH decrease from a pH of 7.0 to a pH of 2.2. In this region there is a increase in settling rate to a small extent as pH is decreased. However, in the second region comprising a pH of 7 or more, the settling time is greatly reduced as the pH is adjusted from a pH of 11 to a pH of 7.

EXAMPLE 4 (Comparison)

A sludge, identified as Sludge III - which comprised approximately 90 to 95% water, 2.5 to 5.0% oily material and 2.5 to 5.0% solids (percent by weight) as an oily substrate. The oily material comprised different types of hydrocarbons, such as aliphatic, unsaturated and aromatic hydrocarbons.

In this treatment, 5 grams of this sludge as an oily substrate were placed in a flask. The pH of the sludge was measured and the pH was 12. To the sludge was added 0.05 grams or about 1% by weight of sludge of a cationic surfactant, "EMCOL CC-42". In addition, 10 grams of hexane was added. The flask was shaken. About 15 to 20 seconds were required for phase differentiating interface formation and for the solids phase and the liquids phase to separate. A liquids phase which contained most of the hydrocarbons had a light amber color. The liquids phase was decanted from the solids phase and this separation constituted one treatment stage. The liquids phase separated was diluted with hexane and a gas chromatograph analysis was conducted. It was found that most of the oily material was transferred into the liquids phase containing the hexane solvent.

To the solids phase from the first treatment stage was added 10 grams of hexane. No additional surfactant was added. The flask was shaken and the mixture allowed to separate. After phase differentiating interface formation and the liquids and solids phases had separated, the liquids phase with solvent containing the hydrocarbons was then decanted off and this constituted a second treatment stage. The procedure of adding 10 grams of hexane to the solids phase was repeated 5 times. After each treatment stage, a sample of the liquids phase was taken for gas chromatographic analysis. FIG. 4 shows three chromatographs of samples, the first two representing the first and fifth treatment stages. The peaks are not totally representative of the concentration because of varying sample dilutions. However, it is clear from these results that the concentration of the hydrocarbons in these samples is much less than other corresponding samples.

To the solids from the fifth treatment stage was added 10 grams of acetone. The third chromatograph in FIG. 4 shows the results of this acetone wash and indicates that certain hydrocarbons were not extracted or washed from the solids by the hexane solvent alone at a pH of 12. The peaks in the acetone wash indicate that hydrocarbon components were present at a level of from 20 ppm to about 100 to 150 ppm.

EXAMPLE 5

To demonstrate the effect of pH on treatment efficiency of Sludge III of Example 4, a sludge identified as Sludge IV was treated.

Figure 5A:
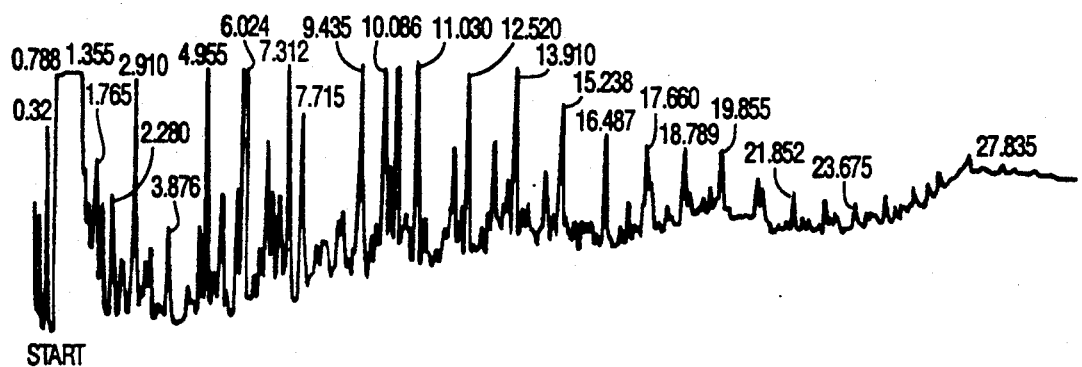
FIGS. 5A-5C show three chromatographs obtained upon analysis of liquids solvent phase samples produced in Example 5.
Figure 5B:
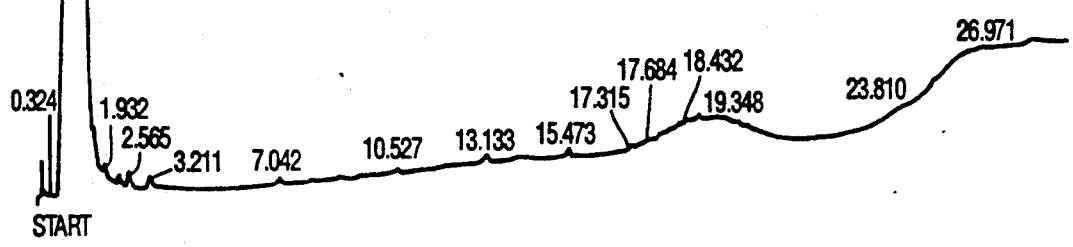
Figure 5C:
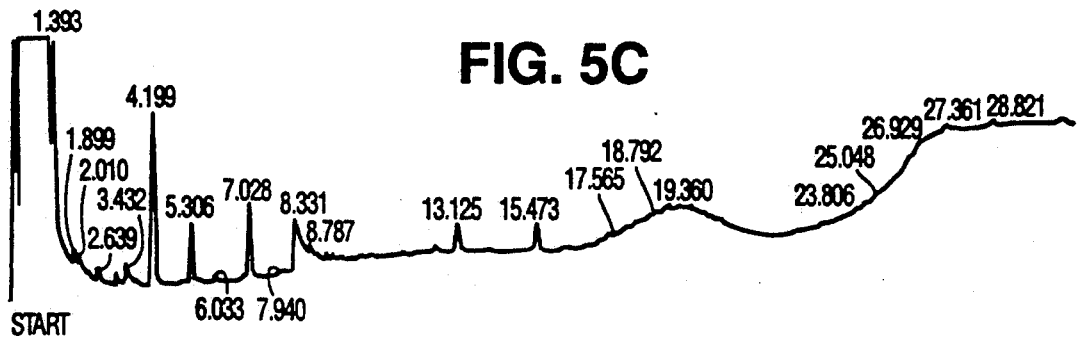

In this example, 5 grams of sludge as an oily substrate were placed in a flask. To the sludge was added 0.5 grams, or about 1% by weight, of a cationic surfactant, "EMCOL CC-42" and 10 grams of hexane. In addition, 0.1 grams of sulfuric acid was added to adjust the pH. The pH of the sludge was measured and the pH was 4. The flask was shaken. About 15 to 20 seconds were required for phase differentiating interface formation and the liquids phase and solids phase to separate. A liquids phase which contained most of the hydrocarbons had a light yellow color. The liquids phase was decanted from the solids phase and this separation constituted one treatment stage. The liquids phase was diluted with hexane and gas chromatographically analyzed. It was found that most of the oily material was transferred into the liquids phase containing the hexane solvent. To the solids phase from the first stage was added 10 grams of hexane. No additional surfactant was added. The flask was shaken and the mixture was allowed to separate. After the phase had separated, the liquids solvent phase containing the hydrocarbons was then decanted off and this constituted a second treatment stage. The procedure of adding 10 grams of hexane to the solids phase was repeated 5 times. After each stage of treatment, a sample of the liquids phase comprising the solvent was removed for gas chromatographic analysis. FIG. 5 shows three chromatographs of samples so obtained, the first two representing the first and fifth treatment stages. The peaks shown are not totally representative of the concentration, however, it is clear that the concentration of the hydrocarbons n these samples is much less than other corresponding samples.

To the solids from the fifth stage was added 10 grams of acetone. The third chromatograph in FIG. 5 shows an analysis of this acetone wash. While it indicates that certain hydrocarbons remained, a comparison with the acetone wash as shown in FIG. 4 shows the most improvement achieved by the practice of the process of this invention is adjusting the pH to less than 7.

EXAMPLE 6

A sludge, identified as Sludge V, which comprised approximately 90 to 95% water, 2.5 to 5.0% oily material and 2.5 to 5.0% solids (percent by weight) was centrifuged. The resulting filter cake was solid in appearance and produced an oily substrate sample comprising approximately 50% water, 25% oily material and 25% solids. The oily material comprised a mixture of different types of volatile and semivolatile hydrocarbons, such as aliphatic, unsaturated and aromatic hydrocarbons. This sludge sample acted like a solid plastic amorphous material since when it was squeezed it did not crumble but remained a gooey mass. Samples, 10 grams each, were placed in vials with 20 grams of various solvents and water but did not easily break down. No breakdown occurred when a sample was shaken with hexane.

In this example, 10 grams of such a filter cake sludge so obtained as described above after water removal were placed in a glass vial. To the sludge was added 0.1% grams, or about 1% by weight of a cationic surfactant, "EMCOL CC-42". In addition, 10 grams of hexane was added. The flask was shaken. About 15 to 20 seconds were required for phase differentiating interface formation and the solids phase and the liquids phase to separate. The liquids phase comprising the solvent, which contained most of the hydrocarbons were decanted from the solids phase and this separation constituted one treatment stage. The liquids phase was diluted with hexane and a sample was gas chromatographically analyzed. It was found that most of the oily material was transferred into the liquids phase containing the hexane solvent.

Figure 6A:
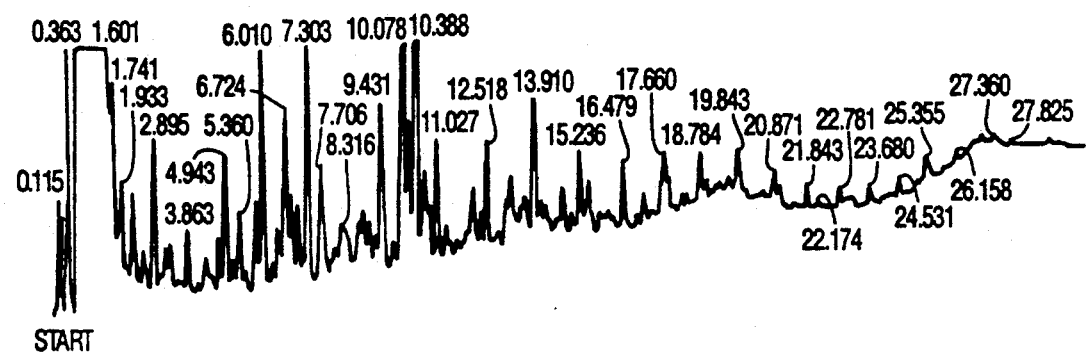
FIGS. 6A-6C show three chromatographs obtained upon analysis of liquids solvent phase samples produced in Example 6.
Figure 6B:
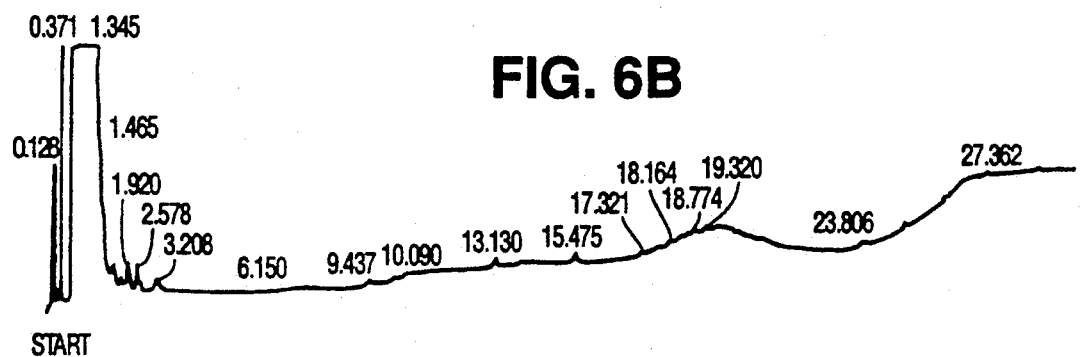
Figure 6C:
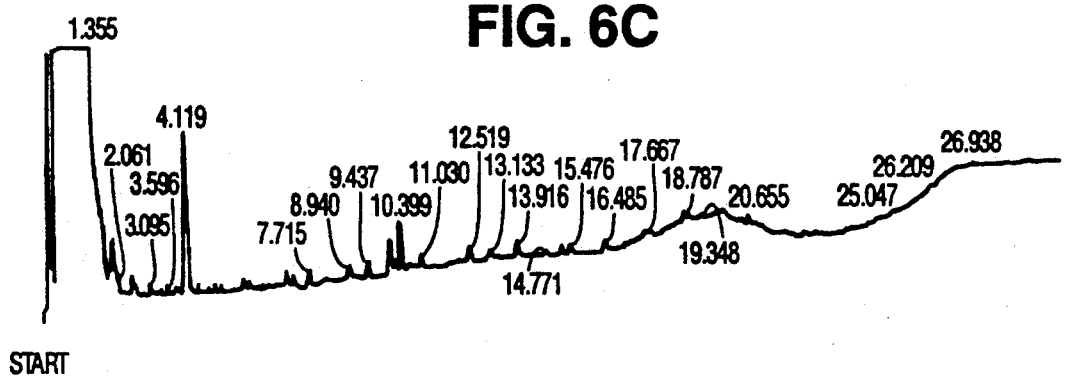

To the solids phase from the first treatment stage was added 10 grams of hexane. No additional surfactant was added. The flask was shaken and the mixture allowed to separate. After the solids and liquids phases had separated, the liquids phase comprising the solvent containing the hydrocarbons was then decanted off and this constituted a second treatment stage. The procedure of adding 10 grams of hexane to the solids phase was repeated 5 times. After each treatment stage a sample of the liquids phase was removed for gas chromatographic analysis. FIG. 6 shows three chromatographs of samples so obtained, the first two representing the first and fifth treatment stages. The peaks are not totally representative of the concentration, however, it is clear that after the fifth treatment stage essentially no hydrocarbons were present.

To the solids from the fifth stage was added 10 grams of acetone. The third chromatograph of FIG. 6 shows the characteristic of this acetone wash and indicates that essentially all hydrocarbons as oily materials were extracted or washed from the solids. The peaks indicate that total hydrocarbon components were present in amounts of about 20 ppm to about 100 to 150 ppm.

EXAMPLE 7

A sludge identified as Sludge 4, which comprised approximately 90 to 95% water, 2.5 to 5.0% oily material and 2.5 to 5.0% solids (percent by weight) as an oily substrate was treated. The oily material comprised different types of hydrocarbons, such as aliphatic, unsaturated and aromatic hydrocarbons.

Ten grams of the sludge as an oily substrate were placed in a flask. Sulfuric acid was added to the sludge and the pH adjusted until the pH was a pH of 7. To the sludge was added 0.1 grams or about 1% by weight of a cationic surfactant, "EMCOL CC-42". In addition, 10 grams of hexane was added. The flask was shaken. About 10 seconds were required for phase differentiating interface formation and the liquids and solids phases to separate. A liquids phase, comprising the solvent and containing most of the hydrocarbons, was decanted from the solid phase and this separation constituted one treatment stage. The liquid was diluted with hexane for gas chromatographic analysis. To the solids from the first treatment stage was added 20 grams of hexane. No additional surfactant was added. The flask was shaken and the mixture allowed to separate. After the solids and liquids phases had separated, the liquids phase comprising the solvent containing the hydrocarbons was then decanted off and this constituted a second treatment stage. The procedure of adding 20 grams of hexane to the solids phase was repeated 6 times. After each treatment stage a sample of the liquids phase was removed for gas chromatographic analysis. FIG. 7 shows two chromatographs of samples, representing the first and last treatment stages. The peaks are not totally representative of the concentration, however, it is clear that the concentration of the hydrocarbons in the last treatment stage was below detectable limits.

Figure 8:
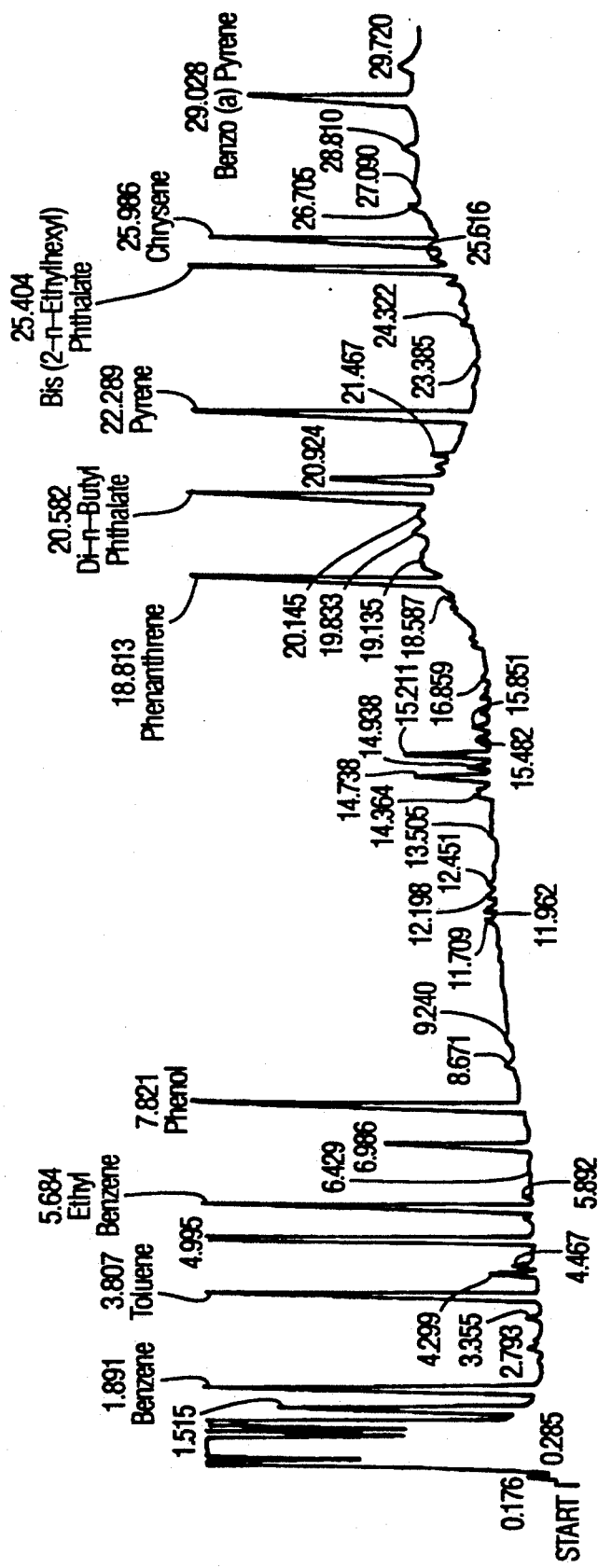
FIG. 8 shows calibration chromatograph of E.P.A. regulated oily materials often appearing in refinery waste identifying the peaks of the oily material and showing them quantitatively at ten ppm.

To understand more clearly the data that has been provided, reference is made to FIG. 8 which provides a calibration curve for the E.P.A. regulated compounds for materials tested and illustrated above.

EXAMPLE 8

This Example exemplifies the use of flocculants in the process of the present invention.

To 5 g of a solids-containing oily substrate from a refinery pit was added enough sulfuric acid to reduce the pH of the oily substrate to below pH 6. The initial pH of the oily substrate was 8.5. To this sample was then added 0.1 g of EMCOL CC-42, a quaternary ammonium salt surfactant by Witco Chemical. 15 g of pentane was then added to the resulting mixture which was next aggitated for approximately 20 seconds. Once dispersion of solids in the solvent was achieved, the sample was allowed to phase separate. Complete phase separation took approximately 20 seconds. Next, 500 ppm of a flocculant of the trade name FILTER AID 9139 manufatured by Nalco Chemical was added to the mixture, which was then agitated and allowed to phase separate. The settling time was reduced to 6 seconds, indicating a significant improvement in settling characteristics.

EXAMPLE 9

This Example illustrates the present invention in treating emulsified solids-containing oily substrates.

A sample of oily substrate containing approximately 50% water, 20% solids and 30% oil and emulsified to the point where phase separation would not occur using conventional emulsion breaking techniques such as emulsion breakers, was placed in a flask, to which was added 0.1 g EMCOL CC-42 surfactant, and 20 g of hexane. The mixture was shaken for about 30 seconds, and subsequently heated slightly to facilitate phase separation, which occurred in about 5 minutes.

In a further aspect of the present invention, it has been surprisingly and unexpectedly found that processed and separated solids/water mixtures in accordance with this invention have physical properties which are significantly different from raw oily substrates containing solids, e.g. sludges, and can be filtered and dewatered in significantly less time than such raw oily substrates, thus, enhancing savings in processing costs. This aspect is more fully illustrated by the following example.

EXAMPLE 10

(Sludge Dewatering)

This Example demonstrates the change in dewatering characteristics of a refinery oily waste which is treated with the extraction process of the invention. In test 1, 400 g of an API oily waste containing approximately 4% oil, 5% solids and 91% water was filtered through No. 40 Whatman filter paper having a diameter of 15 inches. A vacuum of 23 inches Hg was applied during the filtering process.

In test 2, 400 g of the API sludge was treated in accordance with the extraction process of the present invention employing hexane and 1% by weight Witco CC-42 surfactant, whereby substantially all the organic phase was removed. The sludge was then heated at 80° C. to remove any residual solvent. The viscosity of the treated sludge decreased signifiantly as solvent was removed therefrom. The resulting treated sludge containing approximately 70% water was then filtered in the manner described above.

In tests 1 and 2, the filtering times were 35 minutes and 1.5 minutes, respectively, and the filter cake from test 1 contained 70% water, and the filter cake from test 2 contained 45% water. The results are summarized below in Table IV.

TABLE IV

| FILTRATION RATES FOR API SEPARATOR SOLIDS | | | |
|---|---|---|---|
| Test Material | Initial % Water | Final % Water | Minutes |
| 1 Raw API Separator Sludge | 91% | 70% | 35 |
| 2 Processed API Separator Solids | 70% | 45% | 1.5 |

These tests clearly demonstrate the advantageous aspect of the invention in signifiantly improving dewatering characteristics of solids-containing oily substrates.

While the invention has been described in detail and with reference to specific examples thereof, it will be apparent to one skilled in the art that various changes and modifications can be made therein without departing from the spirit and scope thereof.

What is claimed is:

1. A process for treating an oily substrate selected from the group consisting of a mixture comprising water and oily material or a mixture comprising water, solids and oily material as components of said substrate, said process comprising:

contacting said oily substrate with a solvent for said oily material, said solvent for said material ranging in solubility in water from sparingly soluble to substantially water insoluble and a comminuting and dispersing surfactant for said oily substrate, to product at least one phase differentiating interface and to thereby render one or more components of said oily substrate separable.

2. The process of claim 1, wherein said oily substrate comprises water in an amount from about 2% to about 95% by weight.

3. The process of claim 1, wherein said process further comprises removing water from said oily substrate prior to said contacting.

4. The process of claim 1, wherein said oily material comprises one or more compounds selected from the group consisting of aromatic hydrocarbons, aliphatic hydrocarbons and mixtures thereof.

5. The process of claim 4, wherein said oily material comprises one or more aromatic hydrocarbons selected from the group consisting of polychlorinated biphenyl, benzene, toluene and anthracene compounds and halogenated derivatives thereof.

6. The process of claim 4, wherein said oily material comprises one or more aliphatic hydrocarbons selected from the group consisting of chlorinated ethylene and acetone compounds.

7. The process of claim 1, wherein said oily substrate comprises solids in an amount from about 0.01 weight percent to about 70 weight percent of said oily substrate.

8. The process of claim 1, 2, 4, or 7, wherein said oily substrate is an emulsified mixture comprising water, solids and oily material.

9. The process of claim 1, 2, 4, or 7 wherein said oily substrate is an emulsified mixture comprising oily material and water.

10. The process of claim 1, wherein said solvent is a hydrophobic solvent.

11. The process of claim 10, wherein said hydrophobic solvent is a hydrocarbon solvent.

12. The process of claim 11, wherein said hydrocarbon solvent is selected from the group consisting of a lower aliphatic and cyclic saturated hydrocarbon solvents.

13. The process of claim 12, wherein said hydrocarbon solvent is selected from the group consisting of propane, butane, pentane, hexane, heptane, octane, nonane, cyclopropane and cyclohexane.

14. The process of claim 1, wherein said comminuting surfactant is sufficiently soluble in water to cause said oily material to be extracted from said oily substrate.

15. The process of claim 1, wherein said contacting is conducted with said oily substrate being at an acid pH.

16. The process of claim 15, wherein said contacting is conducted with said oily substrate being at a pH of 1 to 6.

17. The process of claim 16, wherein said contacting is conducted with said oily substrate being at a pH of less than 5.5.

18. The process of claim 1, wherein said comminuting surfactant is a nonionic surfactant.

19. The process of claim 18, wherein said nonionic surfactant is selected from the group consisting of a polyethoxy octylphenol and a polyethoxy nonylphenol compounds containing 1 to 6 ethylene oxide units therein.

20. The process of claim 18, wherein said nonionic surfactant has a hydrophilic/lipophilic balance of 4 to 10.

21. The process of claim 18, wherein said nonionic surfactant comprises a compound selected from the group consisting of adducts of fatty acids and amines combined with polyethoxy phenolic compounds.

22. The process of claim 1, wherein said comminuting surfactant is an anionic surfactant.

23. The process of claim 22, wherein said anionic surfactant is octylphenoxypolyethoxyethyl phosphate.

24. The process of claim 1, wherein said comminuting surfactant is a cationic surfactant.

25. The process of claim 24, wherein said cationic surfactant is a quaternary ammonium chloride of a polypropoxy tertiary amine.

26. The process of claim 1, wherein said comminuting surfactant is an amphoteric surfactant.

27. The process of claim 1, wherein said contacting includes agitating said oily substrate and said solvent.

28. The process of claim 1, wherein said contacting comprises a countercurrent contacting of said oily substrate with said solvent and/or said surfactant.

29. A process for treating an oily substrate selected from the group consisting of a mixture comprising water and oily material or a mixture comprising water, solids and oily material as components of said substrate, said process comprising step.
(1) contacting said oily substrate with a solvent for said oily material, said solvent for said material ranging in water solubility from sparingly soluble to substantially water insoluble, and a comminuting and dispersing surfactant for said oily substrate to produce at least one phase differentiating interface, and to thereby render one or more components of said oily substrate separable; and step
(2) separating at least one phase from other phases present.

30. The process of claim 29, wherein said oily substrate comprises water in an amount from about 2% to about 95% by weight.

31. The process of claim 29, wherein said process further comprises removing water from said oily substrate prior to said contacting in step (1).

32. The process of claim 29 wherein said oily material comprises one or more compounds selected from the group consisting of aromatic hydrocarbons, aliphatic hydrocarbons and mixtures thereof.

33. The process of claim 32, wherein said oily material comprises one or more aromatic hydrocarbons selected from the group consisting of polychlorinated biphenyl, benzene, toluene and anthracene compounds and halogenated derivatives thereof.

34. The process of claim 32, wherein said oily material comprises one or more aliphatic hydrocarbons selected from the group consisting of chlorinated ethylene and acetone compounds.

35. The process of claim 29, wherein said oily substrate comprises solids in an amount from about 0.02 weight percent to about 90 weight percent of said oily substrate.

36. The process of claim 29, 30, 32, 35, wherein said oily substrate is an emulsified mixture comprising water, solids and oil material.

37. The process of claim 29, 30, 32 or 35, wherein said oily substrate is an emulsified mixture comprising oily material and water.

38. The process of claim 29, wherein said solvent is a hydrophobic solvent.

39. The process of claim 38, wherein said hydrophobic solvent is a hydrocarbon solvent.

40. The process of claim 39, wherein said hydrocarbon solvent is selected from the group consisting of a lower aliphatic and cyclic saturated hydrocarbon solvents.

41. The process of claim 40, wherein said hydrocarbon solvent is selected from the group consisting of propane, butane, pentane, hexane, heptane, octane, nonane, cyclopropane and cyclohexane.

42. The process of claim 29, wherein said comminuting surfactant is sufficiently soluble in water to cause said oily material to be extracted from said oil substrate.

43. The process of claim 29, wherein said contacting in step (1) is conducted with said oily substrate being at an acid pH.

44. The process of claim 43, wherein said contacting in step (1) is conducted with said oily substrate being at a pH of 1 to 6.

45. The process of claim 44, wherein said contacting in step (1) is conducted with said oily substrate being at a pH of less than 5.5.

46. The process of claim 29, wherein said comminuting surfactant is a nonionic surfactant.

47. The process of claim 46, wherein said nonionic surfactant is selected from the group consisting of a polyethoxy octyl phenol and a polyethoxy nonylphenol compounds containing 1 to 6 ethylene oxide units therein.

48. The process of claim 46, wherein said nonionic surfactant has a hydrophilic/lipophilic balance of 4 to 10.

49. The process of claim 46, wherein said nonionic surfactant comprises a compound selected from the group consisting of adducts of fatty acids and amines combined with polyethoxy phenolic compounds.

50. The process of claim 29, wherein said comminuting surfactant is an anionic surfactant.

51. The process of claim 50, wherein said anionic surfactant is octylphenoxypolyethoxyethyl phosphate.

52. The process of claim 29, wherein said comminuting surfactant is a cationic surfactant.

53. The process of claim 52, wherein said cationic surfactant is a quaternary ammonium chloride of a polypropoxy tertiary amine.

54. The process of claim 29, wherein said comminuting surfactant is an amphoteric surfactant.

55. The process of claim 24, wherein said contacting in step (1) includes agitating said oily substrate.

56. The process of claim 29, wherein said contacting in step (1) comprises a countercurrent contacting of said oily substrate with said solvent or said surfactant.

57. The process of claim 29, wherein said separating in step (2) is by physically separating a liquids phase from a solids phase.

58. The process of claim 57, wherein said separating in step (2) is by decanting said liquids phase from said solids phase.

59. A process for treating an oily substrate selected from the group consisting of a mixture comprising water and oily material or a mixture comprising water, solids and oily material as components of said substrate, said process comprising step:
 (1) contacting said oily substrate with a solvent for said oily material, said solvent for said material ranging in solubility in water from sparingly soluble to substantially water insoluble, and a comminuting and dispensing surfactant for said oily substrate, to produce at least one phase differentiating interface, and to thereby render one or more components of said oily substrate separable step;
 (2) separating at least one phase from other phases present to obtain a separated phase comprising said solvent and at least a portion of said oily material; and step;
 (3) removing said solvent from said separated phase.

60. The process of claim 59, wherein said oily substrate comprises water in an amount from about 2% to about 95% by weight.

61. The process of claim 59, wherein said process further comprises removing water from said oily substrate prior to said contacting in step (1).

62. The process of claim 59, wherein said oily material comprises one or more compounds selected from the group consisting of aromatic hydrocarbons, aliphatic hydrocarbons and mixtures thereof.

63. The process of claim 62, wherein said oily material comprises one or more aromatic hydrocarbons selected from the group consisting of polychlorinated biphenyl, benzene, toluene and anthracene compounds and halogenated derivatives thereof.

64. The process of claim 62, wherein said oily material comprises one or more aliphatic hydrocarbons selected from the group consisting of chlorinated ethylene and acetone compounds.

65. The process of claim 59, wherein said oily substrate comprises solids in an amount from about 0.01 weight percent to about 90 weight percent of said oily substrate.

66. The process of claim 59, 60, 62 or 65, wherein said oily substrate is an emulsified mixture comprising water, solids and oily material.

67. The process of claim 59, 60, 62 or 65, wherein said oily substrate is an emulsified mixture comprising oily material and water.

68. The process of claim 59, wherein said solvent is a hydrophobic solvent.

69. The process of claim 68, wherein said hydrophobic solvent is a hydrocarbon solvent.

70. The process of claim 69, wherein said hydrocarbon solvent is selected from the group consisting of a lower aliphatic and cyclic saturated hydrocarbon solvents.

71. The process of claim 70, wherein said hydrocarbon solvent is selected from the group consisting of propane, butane, pentane, hexane, heptane, octane, nonane, cyclopropane and cyclohexane.

72. The process of claim 71, wherein said comminuting surfactant is sufficiently soluble in water to cause said oily material to be extracted from said oily substrate.

73. The process of claim 59, wherein said contacting in step (1) is conducted with said oily substrate being at an acid pH.

74. The process of claim 73, wherein said contacting in step (1) is conducted with said oily substrate being at a pH of 1 to 6.

75. The process of claim 74, wherein said contacting in step (1) is conducted with said oily substrate being at a pH of less than 5.5.

76. The process of claim 59, wherein said comminuting surfactant is a nonionic surfactant.

77. The process of claim 76, wherein said nonionic surfactant is selected from the group consisting a polyethoxy octyl phenol and a polyethoxy nonylphenol compounds containing 1 to 6 ethylene oxide units therein.

78. The process of claim 76, wherein said nonionic surfactant has a hydrophilic/lipophilic balance of 4 to 10.

79. The process of claim 76, wherein said nonionic surfactant comprises a product selected from the group consisting of adducts of fatty acids and amines combined with polyethoxy phenolic compounds.

80. The process of claim 59, wherein said comminuting surfactant is an anionic surfactant.

81. The process of claim 80, wherein said anionic surfactant is octylphenoxypolyethoxyethyl phosphate.

82. The process of claim 59, wherein said comminuting surfactant is a cationic surfactant.

83. The process of claim 82, wherein said cationic surfactant is a quaternary ammonium chloride of a polypropoxy tertiary amine.

84. The process of claim 59, wherein said comminuting surfactant is an amphoteric surfactant.

85. The process of claim 59, wherein said contacting in step (1) includes agitating said oil substrate.

86. The process of claim 59, wherein the contacting in step (1) comprises a countercurrent contacting of said oily substrate with said solvent or said surfactant.

87. The process of claim 59, wherein said removing of said solvent in step (3) is by distilling off said solvent from a liquids phase separated in step (2).

88. The process of claim 59, wherein the separating in step (2) is by physically separating a liquids phase from a solids phase.

89. The process of claim 59, wherein the separating step is by decanting a liquids phase from a solids phase.

90. A process for treating an oily substrate selected from the group consisting of a mixture comprising water and oily material or a mixture comprising water, solids and oily material as components of said substrate, said process comprising: step
(1) contacting said oily substrate with a solvent for said oily material, said solvent for said material ranging in solubility in water from sparingly soluble to substantially water insoluble, and a comminuting and dispensing surfactant for said oily substrate, to produce at least one phase differentiating interface, and to thereby render one or more components of said oily substrate separable;
(2) separating at least one phase from other phases present to obtain a separated phase comprising said solvent and at least a portion of said oily material; step
(3) recovering said solvent from said separated phase; and step
(4) recycling said recovered solvent to said contacting step (1) as at least part of said solvent used in said contacting step (1).

91. The process of claim 90, wherein said oil substrate comprises water in an amount from about 2% of about 95% by weight.

92. The process of claim 90, wherein said process further comprises removing water from said substrate mixture prior to said contacting in step (1).

93. The process of claim 90, wherein said oil material comprises aromatic hydrocarbons, aliphatic hydrocarbons or a mixture thereof.

94. The process of claim 93 wherein said oily material comprises one or more aromatic hydrocarbons selected from the group consisting of polychlorinated biphenyl, benzene, toluene and anthracene compounds and halogenated derivatives thereof.

95. The process of claim 93, wherein said oily material comprises one or more aliphatic hydrocarbons selected from the group consisting of chlorinated ethylene and acetone compounds.

96. The process of claim 90, wherein said oily substrate comprises solids in an amount from about 0.01 weight percent to about 90 weight percent of said oil substrate.

97. The process of claims 90, 91, 95 or 96, wherein said oily substrate is an emulsified mixture comprising water, solids and oily material.

98. The process of claims 90, 91, 95 or 96, wherein said oily substrate is an emulsified mixture comprising oily material and water.

99. The process of claim 90, wherein said solvent is a hydrophobic solvent.

100. The process of claim 99, wherein said hydrophobic solvent is a hydrocarbon solvent.

101. The process of claim 100, wherein said hydrocarbon solvent is selected from the group consisting of a lower aliphatic and cyclic saturated hydrocarbon solvents.

102. The process of claim 101, wherein said hydrocarbon solvent is selected from the group consisting of propane, butane, pentane, hexane, heptane, octane, nonane, cyclopropane and cyclohexane.

103. The process of claim 90, wherein said comminuting surfactant is sufficiently soluble in water to cause said oily material to be extracted from said oily substrate.

104. The process of claim 90, wherein said contacting in step (1) is conducted with said oily substrate being at an acid pH.

105. The process of claim 104, wherein said contacting in step (1) is conducted with said oily substrate being at a pH of 1 to 6.

106. The process of claim 105, wherein said contacting in step (1) is conducted with said oily substrate being at a pH of less than 5.5.

107. The process of claim 90, wherein said comminuting surfactant is a nonionic surfactant.

108. The process of claim 107, wherein said nonionic surfactant has a hydrophilic/lipophilic balance of 4 to 10.

109. The process of claim 107, wherein said nonionic surfactant comprises a compound selected from the group consisting of adducts of fatty acids and amines combined with polyethoxy phenolic compounds.

110. The process of claim 90 wherein said comminuting surfactant is an anionic surfactant.

111. The process of claim 110, wherein said anionic surfactant is octylphenoxypolyethoxyethyl phosphate.

112. The process of claim 90, wherein said comminuting surfactant is a cationic surfactant.

113. The process of claim 90, wherein said comminuting surfactant is an amphoteric surfactant.

114. The process of claim 112, wherein said nonionic surfactant is selected from the group consisting of a polyethoxy octyl phenol and a polyethoxy nonylphenol compounds containing 1 to 6 ethylene oxide units therein.

115. The process of claim 112, wherein said cationic surfactant is a quaternary ammonium chloride of a polypropoxy tertiary amine.

116. The process of claim 90, wherein said recycling of said solvent is with the addition of additional comminuting surfactant prior to or during used of said recycled solvent during said contacting in step (1).

117. A process for treating an oily substrate selected from the group consisting of a mixture comprising water and oily material or a mixture comprising water, solids and oily material as components of said substrate, said process comprising: step
(1) contacting said oily substrate with a solvent for said oily material, said solvent for said material ranging in solubility in water from sparingly soluble to substantially water insoluble, and a comminuting and dispensing surfactant for said oily substrate, to produce at least one phase differentiating interface, and to thereby render one or more components of said oil substrate separable; then step
(2) separating one or more of the phases present said one or more phases predominantly comprising said constituents of said oil substrate; and step (3) recycling said one or more separated phases from step (2) to said contacting step (1) for further treatment.

118. The process of claim 117, wherein said oily substrate comprises water in an amount from about 2% to about 95% by weight.

119. The process of claim 117, wherein said process further comprises removing water from said oily substrate prior to said contacting in step (1).

120. The process of claim 117, wherein said oily material comprises one or more compounds selected from the group consisting of aromatic hydrocarbons and aliphatic hydrocarbons and mixtures thereof.

121. The process of claim 120, wherein said oily material comprises one or more aromatic, hydrocarbons selected from the group consisting of polychlorinated biphenyl benzene, toluene and anthracene compounds and halogenated derivatives thereof.

122. The process of claim 120, wherein said oily material comprises are or more aliphatic hydrocarbons selected from the group consisting of chlorinated ethylene and acetone components.

123. The process of claim 117, wherein said oily substrate comprises solids in an amount from about 0.01 weight percent to about 90 weight percent of said oily substrate.

124. The process of claim 117, 118, 120 or 123, wherein said oily substrate is an emulsified mixture comprising water, solids and oily material.

125. The process of claim 117, 118, 120 or 123, wherein said oily substrate is an emulsified mixture comprising oily material and water.

126. The process of claim 117, wherein said solvent is a hydrophobic solvent.

127. The process of claim 126, wherein said hydrophobic solvent is a hydrocarbon solvent.

128. The process of claim 127, wherein said hydrocarbon solvent is selected from the group consisting of a lower aliphatic and cyclic saturated hydrocarbon solvents.

129. The process of claim 128, wherein said hydrocarbon solvent is selected from the group consisting of propane, butane, pentane, hexane, heptane, octane, nonane, cyclopropane and cyclohexane.

130. The process of claim 117, wherein said comminuting surfactant is sufficiently soluble in water to cause said oily material to be extracted from said oily substrate.

131. The process of claim 117, wherein said contacting in step (1) is at an acid pH.

132. The process of claim 131, wherein said contacting in step (1) is conducted with said oily substrate being at a pH of 1 to 6.

133. The process of claim 132, wherein said contacting in step (1) is conducted with said oily substrate being at a pH of less than 5.5.

134. The process of claim 117, wherein said comminuting surfactant is a nonionic surfactant.

135. The process of claim 134, wherein said nonionic surfactant is selected from the group consisting of a polyethoxy octyl phenol and a polyethoxy nonylphenol compounds containing 1 to 6 ethylene oxide units therein.

136. The process of claim 134, wherein said nonionic surfactant has a hydrophilic/lipophilic balance of 4 to 10.

137. The process of claim 134, wherein said nonionic surfactant comprises a compound selected from the group consisting of adducts of fatty acids and amines combined with polyethoxy phenolic compounds.

138. The process of claim 117, wherein said comminuting surfactant is an anionic surfactant.

139. The process of claim 138, wherein said anionic surfactant is octylphenoxypolyethoxyethyl phosphate.

140. The process of claim 117, wherein said comminuting surfactant is a cationic surfactant.

141. The process of claim 140, wherein said cationic surfactant is a quaternary ammonium chloride of a polypropoxy tertiary amine.

142. The process of claim 117, wherein said comminuting surfactant is an amphoteric surfactant.

* * * * *

UNITED STATES PATENT AND TRADEMARK OFFICE
CERTIFICATE OF CORRECTION

PATENT NO.    : 5,154,831
DATED         : October 13, 1992
INVENTOR(S)   : Darian et al.

It is certified that error appears in the above-identified patent and that said Letters Patent is hereby corrected as shown below:

Col. 26, line 53, claim 1, "to produce" not "to product"

Col. 28, line 62, claim 42, "oily substrate" not "oil substrate"

Col. 29, line 30, claim 55, Claim 55 should be dependent on claim "29" not claim "24"

Col. 31, line 4, claim 85 and col. 31, line 59, claim 96, "oily substrate" not "oil substrate"

Col. 32, line 68, claim 117, "and" not "and step"

Col. 33, line 15, claim 121 and Col. 33, line 20, claim 122, "said oily material" not "said only material"

Signed and Sealed this

Fifteenth Day of March, 1994

Attest:

BRUCE LEHMAN

Attesting Officer   Commissioner of Patents and Trademarks